(12) United States Patent
Sugio et al.

(10) Patent No.: US 10,218,997 B2
(45) Date of Patent: *Feb. 26, 2019

(54) MOTION VECTOR CALCULATION METHOD, PICTURE CODING METHOD, PICTURE DECODING METHOD, MOTION VECTOR CALCULATION APPARATUS, AND PICTURE CODING AND DECODING APPARATUS

(71) Applicant: Velos Media, LLC, Plano, TX (US)

(72) Inventors: Toshiyasu Sugio, Osaka (JP); Takahiro Nishi, Nara (JP); Youji Shibahara, Tokyo (JP); Hisao Sasai, Osaka (JP)

(73) Assignee: Velos Media, LLC, Plano, TX (US)

( * ) Notice: Subject to any disclaimer, the term of this patent is extended or adjusted under 35 U.S.C. 154(b) by 8 days.

This patent is subject to a terminal disclaimer.

(21) Appl. No.: 15/851,870

(22) Filed: Dec. 22, 2017

(65) Prior Publication Data

US 2018/0124421 A1    May 3, 2018

Related U.S. Application Data

(63) Continuation of application No. 14/957,886, filed on Dec. 3, 2015, now Pat. No. 9,877,038, which is a
(Continued)

(51) Int. Cl.
*H04N 19/513*  (2014.01)
*H04N 19/52*  (2014.01)
(Continued)

(52) U.S. Cl.
CPC ......... *H04N 19/513* (2014.11); *H04N 19/105* (2014.11); *H04N 19/159* (2014.11);
(Continued)

(58) Field of Classification Search
CPC ....... H04N 19/00684; H04N 19/00024; H04N 19/00218; H04N 19/00278; H04N 19/00696
See application file for complete search history.

(56) References Cited

U.S. PATENT DOCUMENTS 6,690,724 B1    2/2004    Kadono
7,233,621 B2    6/2007    Jeon
(Continued)

FOREIGN PATENT DOCUMENTS

EP    1 411 729    4/2004
EP    1 503 599    2/2005
(Continued)

OTHER PUBLICATIONS

International Search Report dated Feb. 7, 2012 in International (PCT) Application No. PCT/JP2011/006517.
(Continued)

*Primary Examiner* — Md N Haque
(74) *Attorney, Agent, or Firm* — Nixon & Vanderhye P.C.

(57) ABSTRACT

A current block included in a current picture included in a coded video stream is decoded by determining a reference picture in the coded video stream, the reference picture being included in one of (i) a first reference picture group of the current block and (ii) a second reference picture group of the current block; selecting a reference motion vector of a reference block in the reference picture such that in situation (A) when the reference block has a first reference motion vector and a second reference motion vector that respectively correspond to the first reference picture group and the second reference picture group, (i) the first reference motion vector is selected when the reference picture is included in the second reference picture group and (ii) the second reference motion vector is selected when the reference picture is included in the first reference picture group, in
(Continued)

situation (B) when the reference block has only one reference motion vector, the only reference motion vector is selected, and in situation (C) when the reference block has no reference motion vector, a zero reference motion vector is selected; deriving the motion vector of the current block using the selected one reference motion vector; and decoding the current block using the derived motion vector.

9 Claims, 36 Drawing Sheets

Related U.S. Application Data continuation of application No. 13/814,564, filed as application No. PCT/JP2011/006517 on Nov. 22, 2011, now Pat. No. 9,300,961.

(60) Provisional application No. 61/416,822, filed on Nov. 24, 2010.

(51) Int. Cl.
*H04N 19/105* (2014.01)
*H04N 19/159* (2014.01)
*H04N 19/176* (2014.01)
*H04N 19/44* (2014.01)

(52) U.S. Cl.
CPC .......... *H04N 19/176* (2014.11); *H04N 19/44* (2014.11); *H04N 19/52* (2014.11)

(56) References Cited

U.S. PATENT DOCUMENTS

| | | | |
|---|---|---|---|
| 7,733,960 B2 | 6/2010 | Kondo et al. | |
| 7,782,936 B2 | 8/2010 | Kondo et al. | |
| 7,970,058 B2 | 6/2011 | Suzuki | |
| 8,462,852 B2 | 6/2013 | Xu et al. | |
| 8,537,897 B2 | 9/2013 | Lee et al. | |
| 9,008,181 B2 | 4/2015 | Chen et al. | |
| 9,300,961 B2 | 3/2016 | Sugio | |
| 9,877,038 B2 | 1/2018 | Sugio | |
| 2002/0181579 A1 | 12/2002 | Vetro et al. | |
| 2004/0008784 A1 | 1/2004 | Kikuchi et al. | |
| 2004/0052507 A1* | 3/2004 | Kondo | H04N 19/50 386/329 |
| 2004/0066848 A1* | 4/2004 | Jeon | H04N 19/521 375/240.15 |
| 2004/0086044 A1 | 5/2004 | Kondo et al. | |
| 2004/0136461 A1 | 7/2004 | Kondo et al. | |
| 2004/0146109 A1* | 7/2004 | Kondo | H04N 19/105 375/240.16 |
| 2004/0190615 A1 | 9/2004 | Abe et al. | |
| 2004/0218674 A1 | 11/2004 | Kondo et al. | |
| 2004/0234143 A1 | 11/2004 | Hagai et al. | |
| 2004/0268266 A1 | 12/2004 | Slotznick et al. | |
| 2005/0013497 A1 | 1/2005 | Hsu et al. | |
| 2005/0053147 A1 | 3/2005 | Mukerjee et al. | |
| 2005/0129125 A1 | 6/2005 | Cha et al. | |
| 2005/0141612 A1 | 6/2005 | Abe et al. | |
| 2005/0152452 A1 | 7/2005 | Suzuki | |
| 2005/0185713 A1 | 8/2005 | Winger et al. | |
| 2006/0198445 A1 | 9/2006 | Li et al. | |
| 2007/0025444 A1 | 2/2007 | Okada et al. | |
| 2007/0036218 A1 | 2/2007 | Burazerovic | |
| 2007/0071107 A1 | 3/2007 | Ha | |
| 2007/0076795 A1 | 4/2007 | Lee | |
| 2007/0211802 A1 | 9/2007 | Kikuchi et al. | |
| 2008/0063060 A1 | 3/2008 | Kondo et al. | |
| 2008/0063061 A1 | 3/2008 | Kondo et al. | |
| 2008/0063071 A1 | 3/2008 | Suzuki | |
| 2008/0063072 A1 | 3/2008 | Suzuki | |
| 2008/0063075 A1 | 3/2008 | Kondo et al. | |
| 2008/0069225 A1 | 3/2008 | Suzuki | |
| 2008/0069231 A1 | 3/2008 | Kondo et al. | |
| 2008/0069232 A1 | 3/2008 | Kondo et al. | |
| 2008/0075171 A1 | 3/2008 | Suzuki | |
| 2008/0240247 A1 | 10/2008 | Lee et al. | |
| 2009/0059068 A1 | 3/2009 | Hanaoka et al. | |
| 2009/0074069 A1 | 3/2009 | Jeon | |
| 2009/0116759 A1 | 5/2009 | Suzuki et al. | |
| 2009/0190660 A1 | 7/2009 | Kusakabe et al. | |
| 2009/0207914 A1 | 8/2009 | Choi et al. | |
| 2010/0079605 A1 | 4/2010 | Wang et al. | |
| 2010/0195723 A1 | 8/2010 | Ikai et al. | |
| 2010/0202539 A1 | 8/2010 | Kondo et al. | |
| 2010/0208817 A1* | 8/2010 | Jeon | H04N 19/00569 375/240.15 |
| 2010/0223239 A1 | 9/2010 | Madsen et al. | |
| 2011/0002389 A1 | 1/2011 | Xu et al. | |
| 2011/0002392 A1 | 1/2011 | Park et al. | |
| 2011/0038420 A1 | 2/2011 | Lee et al. | |
| 2011/0080954 A1 | 4/2011 | Bossen et al. | |
| 2011/0085593 A1 | 4/2011 | Wang et al. | |
| 2011/0090964 A1 | 4/2011 | Xu et al. | |
| 2011/0150095 A1 | 6/2011 | Choi et al. | |
| 2011/0182362 A1 | 7/2011 | Kim et al. | |
| 2012/0008688 A1 | 1/2012 | Tsai et al. | |
| 2012/0106634 A1 | 5/2012 | Jeon et al. | |
| 2012/0147966 A1 | 6/2012 | Lee et al. | |
| 2012/0155542 A1 | 6/2012 | Lee et al. | |
| 2012/0189055 A1 | 7/2012 | Chien et al. | |
| 2012/0189058 A1 | 7/2012 | Chen et al. | |
| 2012/0195368 A1 | 8/2012 | Chien et al. | |
| 2012/0207219 A1 | 8/2012 | Someya | |
| 2012/0269268 A1 | 10/2012 | Kim et al. | |
| 2012/0281764 A1 | 11/2012 | Lee et al. | |
| 2013/0279594 A1 | 10/2013 | Lee et al. | |
| 2013/0336401 A1 | 12/2013 | Jeon | |
| 2013/0336402 A1 | 12/2013 | Xu et al. | |

FOREIGN PATENT DOCUMENTS

| | | |
|---|---|---|
| JP | 2003-333600 | 11/2003 |
| JP | 2004-23458 | 1/2004 |
| JP | 2004-129191 | 4/2004 |
| JP | 2004-208258 | 7/2004 |
| JP | 2004-208259 | 7/2004 |
| JP | 2009-201112 | 9/2009 |
| JP | 5020829 | 6/2012 |
| KR | 10-2004-0099100 | 11/2004 |
| WO | 2004/008775 | 1/2004 |
| WO | 2007/074543 | 7/2007 |

OTHER PUBLICATIONS

"Advanced video coding for generic audiovisual services" ITU-T Recommendation H.264, Mar. 2010.
Byeong-Moon Jeon, "Direct mode in B pictures" Joint Video Team (JVT) of ISO/IEC MPEG & ITU-T VCEG (ISO/IEC JTC1/SC29/WG11 and ITU-T SG16 Q.6), JVT-D056, 4th Meeting: Klagenfurt, Austria, Jul. 22-26, 2002.
Jiali Zheng et al, "Extended Direct Mode for Hierarchical B Picture Coding" IEEE International Conference on Image Processing (ICIP 2005), Sep. 11-14, 2005, vol. 2, p. II-265-II-268.
Test Model under Consideration, Output Document (draft007), Joint Collaborative Team on Video Coding (JCT-VC) of ITU-T SG16 WP3 and ISO/IEC JTC1/SC29/WG11, 2nd Meeting: Geneva, CH, Oct. 2010, JCTVC-B205, pp. 1-14, 26-27, 35-39, 53, 64-64, 78-93.
Toshiyasu Sugio and Takahiro Nishi, Modified usage of predicted motion vectors in forward directional bi-predictive coding frame, Joint Collaborative Team on Video Coding (JCT-VC) of ITU-T SG16 WP3 and ISO/IEC JTC1/SC29/WG11, 4th Meeting: Daegu, KR, Jan. 2011, JCTVC-D274, pp. 1-7.
Jian-Liang Lin et al., Improved Advanced Motion Vector Prediction, Joint Collaborative Team on Video Coding (JCT-VC) of ITU-T SG16 WP3 and ISO/IEC JTC1/SC29/WG11, 4th Meeting: Daegu, KR, Jan. 2011, JCTVC-D125_r2, pp. 1-8.
Toshiyasu Sugio and Takahiro Nishi, Modified derivation process of temporal motion vector predictor, Joint Collaborative Team on

(56) References Cited

OTHER PUBLICATIONS

Video Coding (JCT-VC) of ITU-T SG16 WP3 and ISO/IEC JTC1/SC29/WG11, 4th Meeting: Daegu, KR, Jan. 2011, JCTVC-D273, pp. 1-4.
ITU-T H.264, 'Telecommunication Standardization Sector of ITU, Series H: Audiovisual and Multimedia Systems Infrastructure of audiovisual services—Coding of moving video, Advanced video coding for generic audiovisual services, Mar. 2010.
"Test Model under Consideration", Output Document (draft007), Joint Collaborative Team on Video Coding (JCT-VC) of ITU-T SG16 WP3 and ISO/IEC JTC1/SC29/WG11 2nd Meeting: Geneva, CH, Document: JCTVC-B205, ITU-T, Oct. 2010.
Byeong-Moon Jeon, "Direct mode in B pictures", Joint Video Team (JVT) of ISO/IEC MPEG & ITU-T VCEG (ISO/IEC JTC1/SC29/WG11 and ITU-T SG16 Q.6) 4th Meeting: Klagenfurt, Austria, Contribution: JVT-D056, ITU-T, Jul. 2002.
J. Jung et al., "TE 11: Report on experiment 3. 3 .b: 'temporally oriented' set of predictors for MV -Competition", Joint Collaborative Team on Video Coding (JCT-VC) of ITU-T SG16 WP3 and ISO/IEC JTC1/SC29/WG11 3rd Meeting: Guangzhou, CN, Document: JCTVC-C291, ITU-T, Oct. 2010.
Jiali Zheng et al., "Expended Direct Mode for Hierarchical B Picture Coding", IEEE International Conference on Image Processing, 2005, ICIP 2005, vol. 2, IEEE, Sep. 11, 2005, pp. II-265-268.
Joel Jung and Guillaume Laroche, "Competition-Based Scheme for Motion Vector Selection and Coding", ITU Telecommunications Standardization Sector Study Group 16 Question 6 Video Coding Experts Group (VCEG) $29^{th}$ Meeting: Klagenfurt, Austria, Document VCEG-AC06, ITU-T, Jul. 2006.
"Test Model under Consideration", Output Document (draft007), Joint Collaborative Team on Video Coding (JCT-VC) of ITU-T SG16 WP3 and ISO/IEC JTC1/SC29/WG11, 2nd Meeting: Geneva, CH, Oct. 2010, JCTVC-B205, pp. 1-14, 26, 27, 35-39, 53, 61-64 and 80-93.
Toshiyasu Sugio et al., "Modified usage of predicted motion vectors in forward directional bi-predictive coding frame", Joint Collaborative Team on Video Coding (JCT-VC) of ITU-T SG16 WP3 and ISO/IEC JTC1/SC29/WG11, JCTVC-D274, 4th Meeting: Daegu, KR, Jan. 2011.
Jian-Liang Lin et al., "Improved Advanced Motion Vector Prediction", Joint Collaborative Team on Video Coding (JCT VC) of ITU-T SG16 WP3 and ISO/IEC JTC1/SC29/WG11, JCTVC-D125_r2, 4th Meeting: Daegu, KR, Jan. 2011, pp. 1-8.
Toshiyasu Sugio et al., "Modified derivation process of temporal motion vector predictor", Joint Collaborative Team on Video Coding (JCT-VC) of ITU-T SG16 WP3 and ISO/IEC JTC1/SC29/WG11, 4th Meeting: Daegu, KR, Jan. 2011, JCTVC-D273, pp. 1-4.
"Test Model under Consideration" Output Document ( draft007), Joint Collaborative Team on Video Coding (JCT-VC) of ITU-T SG 16 WP3 and ISO/IEC JTC1/SC29/WG 11, 2nd Meeting: Geneva, CH, Document: JCTVC-B205, Oct. 2010, pp. 78-93.
International Search Report dated Mar. 6, 2012 in corresponding International Application No. PCT/JP2011/006641.
"Test Model under Consideration", Output Document (draft005), Joint Collaborative Team on Video Coding (JCT-VC) of ITU-T SG16 WP3 and ISO/IEC JTC1/SC29/WG11, JCTVC-B205, 2nd Meeting: Geneva, CH, Sep. 2010, pp. 1-6, and 82-96.
International Search Report dated Apr. 24, 2012 in corresponding International Application No. PCT/JP2012/000131.
"Test Model under Consideration", Output Document (draft007), Joint Collaborative Team on Video Coding (JCT-VC) of ITU-T SG16 WP3 and ISO/IEC JTC1/SC29/WG11, 2nd Meeting: Geneva, CH, Document: JCTVC-B205, ITU-T, Oct. 2010, pp. 78-93.
Draft of Version 4 of ISO/IEC 14496-10, Joint Video Team (JVT) of ISO/IEC MPEG & ITU-T VECG (ISO/IEC JTC1/SC29/WG11 and ITU T SG16 Q.6), 14th Meeting: Hong Kong, CH, Jan. 18-21, 2005, Document: JVT-N050d1, Filename: JVT-N050d1.doc, Date: Jan. 28, 2005, pp. 105-106.
International Search Report dated May 29, 2012 in corresponding International Application No. PCT/JP2012/001389.
"Test Model under Consideration", Output Document (draft007), Joint Collaborative Team on Video Coding (JCT-VC) of ITU-T SG16 WP3 and ISO/IEC JTC1/SC29/WG11, JCTVC-B205, 2nd Meeting: Geneva, CH, Oct. 2010, pp. 1-6 and 80-93.
Byeong-Moon Jeon, "Direct mode in B pictures", Joint Video Team (JVT) of ISO/IEC MPEG & ITU-T VCEG (ISO/IEC JTC1/SC29/WG11 and ITU-T SG16 Q.6) JVT-D056, 4th Meeting: Klagenfurt, Austria, Jul. 2002, pp. 1-7.
Toshiyasu Sugio et al., "CE9: Experiment A, I, J and S Modified derivation process of reference index for skip mode and temporal motion vector predictor", Joint Collaborative Team on Video Coding (JCT-VC) of ITU-T SG16 WP3 and ISO/IEC JTC1/SC29/WG11, $5^{th}$ Meeting: Geneva, CH, Mar. 2011, JCTVC-E230, pp. 1-6.
Triceps corporation, "Jisedai Dougazou Fugouka Houshiki (Next Generation Video Coding Method)", MPEG-4 AVC H.264, Mar. 12, 2004, pp. 64-66 (Chapter 6.2 to 7) (with partial translation).
International Search Report dated Feb. 7, 2012 in corresponding International Application No. PCT/JP2011/006517.
Extended European Search Report dated May 20, 2014 in European Application No. 12734216.0.
Guillaume Laroche et al., "RD Optimized Coding for Motion Vector Predictor Selection", IEEE Transactions on Circuits and Systems for Video Technology, IEEE Service Center, Piscataway, NJ, US, vol. 18, No. 9, Sep. 1, 2008, pp. 1247-1257, XP011231739.
Iain E. Richardson, "The H.264 Advanced Video Compression Standard, 2nd Edition", Chapter 5 "H.264 syntax", Apr. 20, 2010, XP030001636.
Joel Jung et al., "Competition-Based Scheme for Motion Vector Selection and Coding", ITU-Telecommunications Standardization Sector, Study Group 16 Question 6, Video Coding Experts Group (VCEG), VCEG-AC06rl, 29th Meeting: Klagenfurt, Austria, Jul. 17-18, 2006, XP030003490.
Frank Bossen et al., "Simplified motion vector coding method", Joint Collaborative Team on Video Coding (JCT-VC) of ITU-T SG16 WP3 and ISO/IEC JTC1/SC29/WG11, JCTVC-B094, 2nd Meeting: Geneva, CH, Jul. 21-28, 2010.
"Test Model under Consideration", Joint Collaborative Team on Video Coding (JCT-VC) of ITU-T SG16 WP3 and ISO/IEC JTC1/SC29/WG11, JCTVC-A205, 1st Meeting: Dresden, DE, Apr. 15-23, 2010, pp. 39, 74, and 75.
Extended European Search Report dated Mar. 16, 2016 in European Patent Application No. 11843582.5.
Office Action dated Jun. 24, 2016 in U.S. Appl. No. 13/985,315.
Office Action dated Nov. 3, 2016 in U.S. Appl. No. 14/957,886.
Office Action dated Feb. 28, 2017 in U.S. Appl. No. 14/856,965.
Office Action dated Apr. 21, 2017 in U.S. Appl. No. 13/985,315.
European Office Action dated Nov. 23, 2017 in EP 11843582.5, 5 pages.
Korean Office Action dated May 2, 2018 in KR Application No. 10-2018-7002497 and English translation, 8 pages.

\* cited by examiner

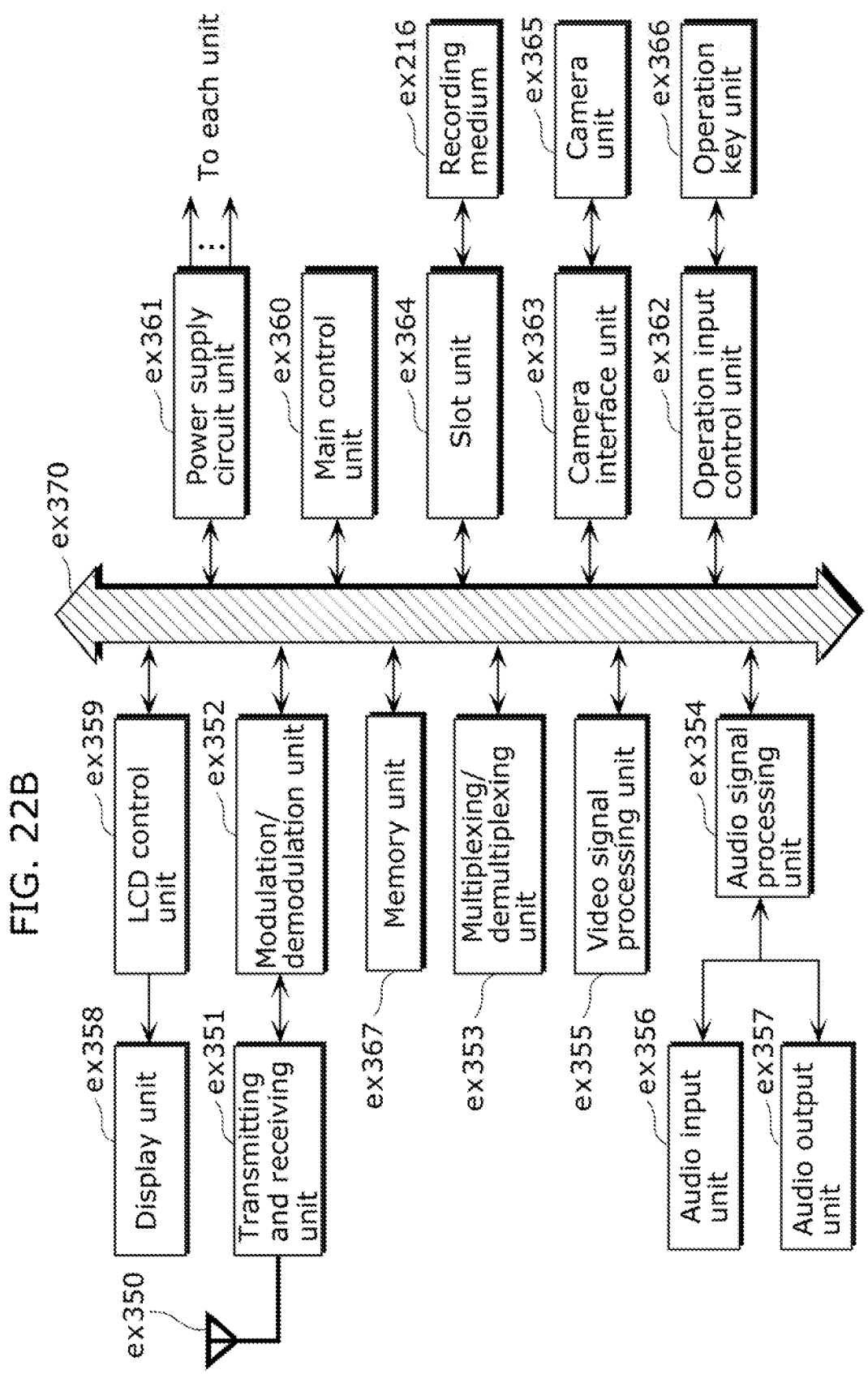

FIG. 23

Video stream (PID=0x1011 Primary video)

Audio stream (PID=0x1100)

Audio stream (PID=0x1101)

Presentation graphics stream (PID=0x1200)

Presentation graphics stream (PID=0x1201)

Interactive graphics stream (PID=0x1400)

Video stream (PID=0x1B00 Secondary video)

Video stream (PID=0x1B01 Secondary video)

FIG. 34

| Corresponding standard | Driving frequency |
|---|---|
| MPEG4. AVC | 500MHz |
| MPEG2 | 350MHz |
| ⋮ | ⋮ |

MOTION VECTOR CALCULATION METHOD, PICTURE CODING METHOD, PICTURE DECODING METHOD, MOTION VECTOR CALCULATION APPARATUS, AND PICTURE CODING AND DECODING APPARATUS

CROSS-REFERENCE TO RELATED APPLICATION

This application is a continuation of U.S. application Ser. No. 14/957,886, filed Dec. 3, 2015, which is a continuation of U.S. application Ser. No. 13/814,564, filed Feb. 6, 2013 (now U.S. Pat. No. 9,300,961), which is a US National Stage of PCT/JP2011/006517, filed Nov. 22, 2011, and claims the benefit of U.S. Provisional Application No. 61/416,822, filed Nov. 24, 2010, the entire contents of each of which are incorporated herein by reference.

TECHNICAL FIELD

The present invention relates to a method of calculating a motion vector, a picture coding method and a picture decoding method which use the motion vector, and so on.

BACKGROUND

In coding processing of moving pictures, a quantity of information is generally reduced using redundancy of the moving pictures in spatial and temporal directions. Here, a general method using the redundancy in the spatial direction is represented by the transformation into frequency domain while a general method using the redundancy in the temporal direction is represented by inter-picture prediction (hereinafter referred to as inter prediction). In a coding process using the inter prediction (an inter prediction coding process), when coding a certain picture, a coded picture located before or after the current picture to be coded in display time order is used as a reference picture. Subsequently, a motion vector of the current picture with respect to the reference picture is estimated, and a difference is calculated between image data of the current picture and prediction picture data resulting from motion compensation based on the motion vector, to remove the redundancy in the temporal direction.

In the moving picture coding scheme called H. 264, which has already been standardized, three types of pictures: I-picture, P-picture, and B-picture, are used to reduce the quantity of information. The I-picture is a picture on which no inter prediction coding process is performed, that is, on which a coding process using intra-picture prediction (hereinafter referred to as intra prediction) is performed. The P-picture is a picture on which the inter prediction coding process is performed with reference to one coded picture located before or after the current picture in display time order. The B-picture is a picture on which the inter prediction coding process is performed with reference to two coded pictures located before or after the current picture in display time order.

Furthermore, in the moving picture coding scheme called H. 264, a coding mode which is referred to as temporal direct can be selected to derive a motion vector in coding the B-picture (see Non Patent Literature 1, for example). The inter prediction coding process in temporal direct is described with reference to FIG. 1.

FIG. 1 illustrates an inter prediction coding process in temporal direct and a method of calculating a motion vector.

As shown in FIG. 1, a block (to be processed) Ba of a picture (to be coded) B2 is coded in the inter prediction coding process in temporal direct. In this case, a motion vector "a" is used which has been used to code a block Bb, co-located with the block Ba, in a picture P3 serving as a reference picture located after the picture B2. The motion vector "a" is a motion vector which has been used to code the block Bb and refers to a picture (a reference picture) P1. Here, two motion vectors "b" and "c" parallel to the motion vector "a" are calculated for the block Ba. Specifically, a block, indicated by the motion vector "b", included in the reference picture P1 located before the block Ba in display time order and a block, indicated by the motion vector "c", included in the reference picture P3 located after the block Ba in display time order are obtained, and using bi-directional prediction with reference to the obtained blocks, the block Ba is coded. It is to be noted that the motion vector to be used in coding the block Ba is the motion vector "b" directed forward to indicate the reference picture P1 and the motion vector "c" directed backward to indicate the reference picture P3.

CITATION LIST

Non Patent Literature

[NPL 1]
ITU-T H.264 03/2010

SUMMARY

However, in the conventional temporal direct, the motion vector to be used in the temporal direct, that is, the motion vector to be used in calculating a motion vector of a current block to be processed, is a motion vector of a reference picture (specifically, a reference block) located after the current block in display time order and limited to a motion vector directed forward in display time order.

Such a limitation of the motion vector to be used in the temporal direct causes problems of making it difficult to calculate the motion vector most suitable for the current block, which leads to a decreased compression rate.

Thus, the present invention has an object to solve the above problems, and the object is to provide a motion vector calculation method, a picture coding method, a picture decoding method, and so on, which derive the motion vector most suitable for the current block and attain a higher compression rate.

In order to achieve the above object, a motion vector calculation method according to an aspect of the present invention is a motion vector calculation method of calculating a motion vector of a current block to be processed that is included in a moving picture, the motion vector calculation method comprising: a selection step of selecting one of at least one reference motion vector of a reference block; and a calculation step of calculating the motion vector of the current block using the one reference motion vector selected in the selection step, wherein, in the selection step, when the reference block has two reference motion vectors, one of the two reference motion vectors is selected based on whether the reference block is located before or after the current block in display time order, and when the reference block has only one reference motion vector, the one reference motion vector is selected.

With this, one of two reference motion vectors is selected based on whether the reference block is located before or after the current block in display time order. For example, the reference block is a co-located block, and the current block is a block to be coded or a block to be decoded. Furthermore, the reference motion vector is a motion vector used to code or decode the reference block. Thus, in the motion vector calculation method according to an aspect of the present invention, even when the reference block has two reference motion vectors, a suitable reference motion vector can be selected according to a position of the reference block, and, for example, scaling the selected reference motion vector allows calculation or derivation of the most suitable motion vector for the current block. As a result, the compression rate of the current block can increase.

Furthermore, it may be that in the selection step, in the case where the reference block has, as the two reference motion vectors, a forward reference motion vector directed forward and a backward reference motion vector directed backward, the forward reference motion vector is selected from among the two reference motion vectors when the reference block is located after the current block, and the backward reference motion vector is selected from among the two reference motion vectors when the reference block is located before the current block.

With this, a suitable reference motion vector can be reliably selected.

In order to achieve the above object, a motion vector calculation method according to another aspect of the present invention is a motion vector calculation method of calculating a motion vector of a current block to be processed that is included in a moving picture, the motion vector calculation method comprising: a selection step of selecting one of at least one reference motion vector of a reference block; and a calculation step of calculating the motion vector of the current block using the one reference motion vector selected in the selection step, wherein, in the selection step, when the reference block has two reference motion vectors, one of the two reference motion vectors is selected based on a temporal distance between the reference block and a picture indicated by each of the two reference motion vectors, and when the reference block has only one reference motion vector, the one reference motion vector is selected.

With this, one of the two reference motion vectors is selected based on temporal distances between the reference block and the respective pictures indicated by the two reference motion vectors. Thus, in the motion vector calculation method according to another aspect of the present invention, even when the reference block has two reference motion vectors, a suitable reference motion vector can be selected according to a temporal distance between pictures, and, for example, scaling the selected reference motion vector allows calculation or derivation of the most suitable motion vector for the current block. As a result, the compression rate of the current block can increase.

In order to achieve the above object, a motion vector calculation method according to another aspect of the present invention is a motion vector calculation method of calculating a motion vector of a current block to be processed that is included in a moving picture, the motion vector calculation method comprising: a selection step of selecting one of at least one reference motion vector of a reference block; and a calculation step of calculating the motion vector of the current block using the one reference motion vector selected in the selection step, wherein, in the selection step, when the reference block has two reference motion vectors, one of the two reference motion vectors is selected based on a magnitude of each of the two reference motion vectors, and when the reference block has only one reference motion vector, the one reference motion vector is selected.

With this, one of the two reference motion vectors is selected based on respective magnitudes of the two reference motion vectors. Thus, in the motion vector calculation method according to another aspect of the present invention, even when the reference block has two reference motion vectors, a suitable reference motion vector can be selected according to magnitudes of the two reference motion vectors, and, for example, scaling the selected reference motion vector allows calculation or derivation of the most suitable motion vector for the current block. As a result, the compression rate of the current block can increase.

Furthermore, in order to achieve the above object, a picture coding method according to an aspect of the present invention is a picture coding method of coding a moving picture, comprising: the selection step and the calculation step in the motion vector calculation method according to one of the above aspects of the present invention; and a coding step of coding the current block using the motion vector calculated in the calculation step.

With this, even when the reference block has two reference motion vectors, the current block can be coded using the most suitable motion vector calculated for the current block, which allows an increase in the compression rate.

Furthermore, the picture coding method may comprise: a determination step of determining, as the reference block, one of a block located before the current block in display time order and a block located after the current block in display time order; a generation step of generating a position flag indicating whether the reference block determined in the determination step is located before or after the current block; and an addition step of adding the position flag generated in the generation step, to a picture including the current block coded in the coding step.

With this, since a picture including the current coded block has a position flag, the picture decoding apparatus which has obtained this picture is capable of easily determining, based on the position flag, whether the reference block is located before or after the current block. Thus, even when the reference block has two reference motion vectors, the picture decoding apparatus is capable of easily selecting a suitable reference motion vector, and, for example, by scaling the selected reference motion vector, the picture decoding apparatus is capable of calculating or deriving the most suitable motion vector for the current block to be coded (or to be decoded). As a result, it is possible to appropriately decode the current block coded at the high compression rate.

Furthermore, it may be that in the selection step, in the case where the reference block has, as the two reference motion vectors, a forward reference motion vector directed forward and a backward reference motion vector directed backward, the forward reference motion vector is selected from among the two reference motion vectors when the position flag indicates that the reference block is located after the current block, and the backward reference motion vector is selected from among the two reference motion vectors when the position flag indicates that the reference block is located before the current block.

With this, a suitable reference motion vector can be reliably selected according to the position flag.

Furthermore, it may be that the coding step includes: a comparison step of comparing coding efficiency of the current block according to the motion vector calculated in the calculation step and coding efficiency of the current block according to a motion vector resulting from motion estimation for the current block; a motion vector selection step of selecting, based on a result of the comparison in the comparison step, a motion vector having high coding efficiency from among the motion vector calculated in the calculation step and the motion vector resulting from motion estimation; and a block coding step of coding the current block according to the motion vector selected in the motion vector selection step.

With this, out of the motion vector calculated in temporal direct for the current block and the motion vector resulting from motion estimation for the current block, a motion vector having higher coding efficiency is selected, and according to the selected motion vector, the current block is coded, which allows a further increase in the compression rate or the coding efficiency.

Furthermore, in order to achieve the above object, a picture decoding method according to an aspect of the present invention is a picture decoding method of decoding a coded moving picture, comprising: the selection step and the calculation step in the motion vector calculation method according to one of the above aspects of the present invention; and a decoding step of decoding the coded current block included in the coded moving picture, using the motion vector calculated in the calculation step.

With this, even when the reference block has two reference motion vectors, the current block can be decoded using the most suitable motion vector calculated for the current block, which allows appropriate decoding of the current block coded at a high compression rate.

Furthermore, it may be that the picture decoding method further comprises an obtaining step of obtaining a position flag added to a picture including the current block, wherein, in the selection step, in the case where the reference block has, as the two reference motion vectors, a forward reference motion vector directed forward and a backward reference motion vector directed backward, the forward reference motion vector is selected from among the two reference motion vectors when the position flag indicates that the reference block is located after the current block, and the backward reference motion vector is selected from among the two reference motion vectors when the position flag indicates that the reference block is located before the current block.

With this, since a picture including the current block has a position flag, it is possible to easily determine, based on the position flag, whether the reference block is located before or after the current block. Thus, even when the reference block has two reference motion vectors, a suitable reference motion vector can be easily selected according to the position flag, and, for example, by scaling the selected reference motion vector, it is possible to calculate or derive the most suitable motion vector for the current block to be coded (or to be decoded). As a result, it is possible to appropriately decode the current block coded at the high compression rate.

It is to be noted that the present invention can be implemented not only as the above motion vector calculation method, picture coding method, and picture decoding method, but also as a device and an integrated circuit which operate according to those methods, a program which causes a computer to operate according to those methods, and a recording medium or the like in which the program is stored.

According to the present invention, the use of new criteria for selecting the motion vector to be used in the temporal direct allows not only derivation of the motion vector most suitable for the current block, but also an increase in the compression rate.

BRIEF DESCRIPTION OF DRAWINGS

FIG. 22B shows an example of a configuration of the cellular phone.

FIG. 23 shows a structure of multiplexed data.

FIG. 34 shows an example of a look-up table in which standards of video data are associated with the driving frequencies.

DESCRIPTION OF EXAMPLE EMBODIMENTS

Embodiments of the present invention are described below with reference to the drawings.

Embodiment 1

Figure 1:
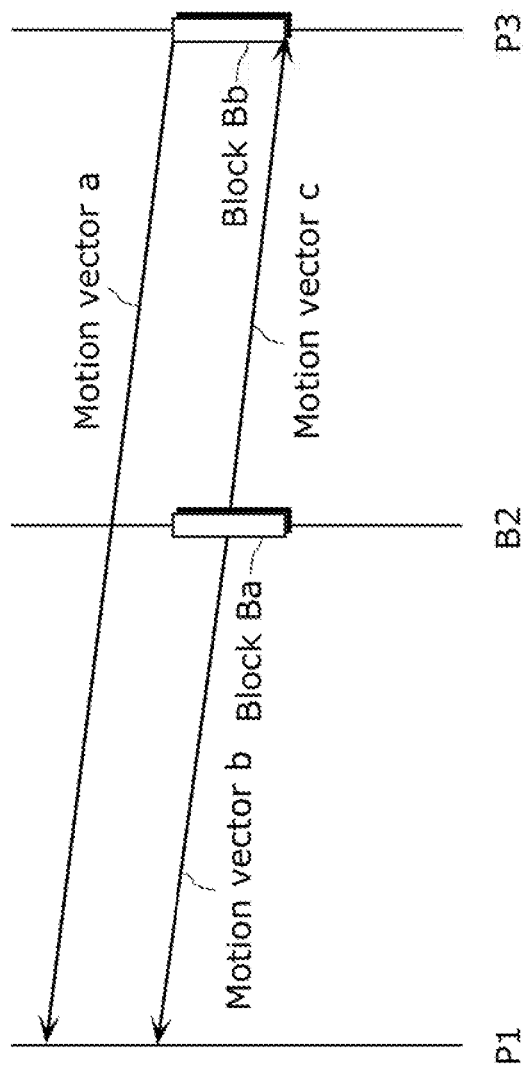
FIG. 1 illustrates an inter prediction coding process in temporal direct and a method of calculating a motion vector.
Figure 2:
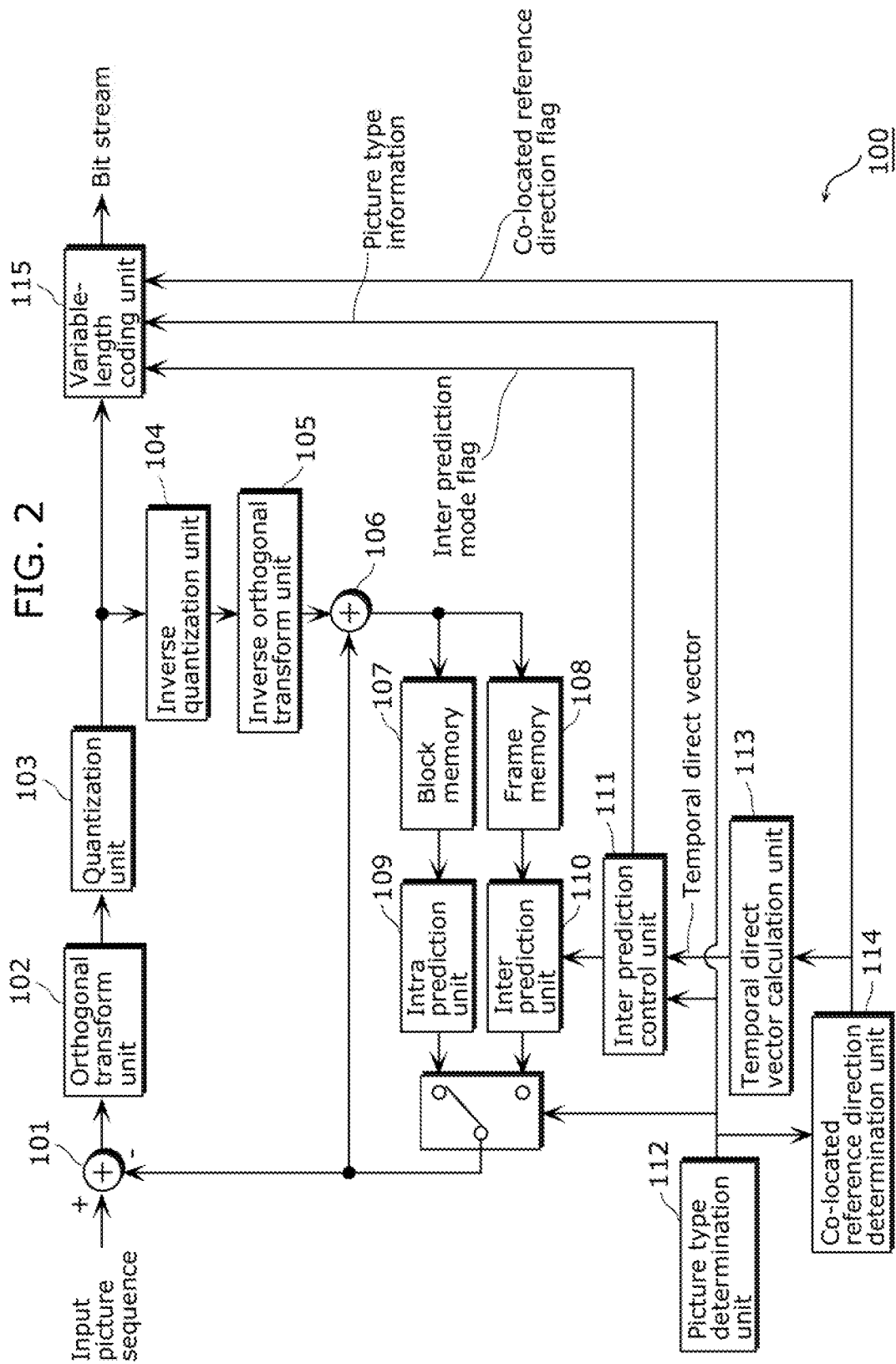
FIG. 2 is a block diagram showing a configuration of a picture coding apparatus using a picture coding method according to Embodiment 1 of the present invention.

FIG. 2 is a block diagram showing a structure of a picture coding apparatus using a picture coding method according to Embodiment 1 of the present invention.

A picture coding apparatus 100 according to this embodiment includes, as shown in FIG. 2, a subtractor 101, an adder 106, an orthogonal transform unit 102, a quantization unit 103, an inverse quantization unit 104, an inverse orthogonal transform unit 105, a block memory 107, a frame memory 108, an intra prediction unit 109, an inter prediction unit 110, an inter prediction control unit 111, a picture type determination unit 112, a temporal direct vector calculation unit 113, a co-located reference direction determination unit 114, and a variable-length coding unit 115.

The subtractor 101 generates prediction error picture data by subtracting, from an input picture sequence that is moving pictures, prediction picture data generated by the intra prediction unit 109 or the inter prediction unit 110.

The orthogonal transform unit 102 transforms an area of the prediction error picture data from image domain into frequency domain.

The quantization unit 103 performs a quantization process on a coefficient sequence that is the prediction error picture data transformed into frequency domain.

The inverse quantization unit 104 performs an inverse quantization process on the coefficient sequence treated with the quantization process of the quantization unit 103.

The inverse orthogonal transform unit 105 transforms, from frequency domain into image domain, the area of the coefficient sequence treated with the inverse quantization process.

The adder 106 generates a reconstructed picture data by adding, to the prediction picture data, the prediction error picture data that is the coefficient sequence transformed by the inverse orthogonal transform unit 105 into image domain.

The block memory 107 stores the reconstructed picture data in units of blocks, and the frame memory 108 stores the reconstructed picture data in units of frames.

The picture type determination unit 112 determines which one of the picture types: I-picture, B-picture, and P-picture, is used to code a picture included in the input picture sequence, and generates picture type information indicating the determined picture type.

The intra prediction unit 109 performs intra prediction for the current block (to be processed) using the reconstructed picture data stored in units of blocks in the block memory 107, and thereby generates prediction picture data.

The inter prediction unit 110 performs inter prediction for the current block using the reconstructed picture data stored in units of frames in the frame memory 108, and thereby generates prediction picture data.

The co-located reference direction determination unit 114 determines which one of a block included in a picture located before the current picture or block (to be processed) in display time order (hereinafter referred to as a forward reference block) and a block included in a picture located after the current picture or block (to be processed) in display time order (hereinafter referred to as a backward reference block) will be a co-located block. The co-located block will be a reference block to which the current block refers. The co-located reference direction determination unit 114 then generates a co-located reference direction flag (a position flag) for each picture to add the co-located reference direction flag (the position flag) to the current picture. Here, the co-located block indicates a block which is included in a picture different from a picture including the current block and whose position in the picture is the same as that of the current block. It is to be noted that, as long as the co-located block is a block included in a picture different from the picture including the current block, the position, in the picture, of the co-located block may be different from the position of the current block.

In the case where the co-located block is a forward reference block having two or more motion vectors, the temporal direct vector calculation unit 113 derives a motion vector of the current block in temporal direct using one of the motion vectors which is directed backward in display time order (hereinafter referred to as a backward reference motion vector). On the other hand, in the case where the co-located block is a backward reference block having two or more motion vectors, the temporal direct vector calculation unit 113 derives a motion vector of the current block in temporal direct using one of the motion vectors which is directed forward in display time order (hereinafter referred to as a forward reference motion vector). It is to be noted that the forward reference motion vector and the backward reference motion vector of the co-located block are collectively referred to as a reference motion vector below. In addition, the temporal direct vector calculation unit 113 is configured as a motion vector calculation apparatus.

Furthermore, in the case where the co-located block has only one reference motion vector, the temporal direct vector calculation unit 113 derives a motion vector of the current block in temporal direct using the one reference motion vector of in the co-located block. For example, the temporal direct vector calculation unit 113 determines whether or not the one reference motion vector is a forward reference motion vector, and when the one reference motion vector is a forward reference motion vector, the temporal direct vector calculation unit 113 derives a motion vector of the current block in temporal direct using the forward reference motion vector. On the other hand, when the one reference motion vector is not a forward reference motion vector, the temporal direct vector calculation unit 113 derives a motion vector of the current block in temporal direct using a backward reference motion vector. Furthermore, when the co-located block has no reference motion vectors, the temporal direct vector calculation unit 113 stops the derivation of a motion vector in temporal direct, or derives a motion vector of the current block assuming that the reference motion vector is 0.

The inter prediction control unit 111 determines a motion vector to be used in inter prediction. Specifically, for the current block, the inter prediction control unit 111 compares the motion vector resulting from motion estimation and the motion vector derived in temporal direct, to determine a motion vector having higher accuracy as the motion vector to be used in inter prediction. In addition, the inter prediction control unit 111 generates, for each block, an inter prediction mode flag indicating whether the motion vector is to be derived by motion estimation or in temporal direct, and adds the generated inter prediction mode flag to the current block.

The variable-length coding unit 115 generates a bit stream that is coded moving pictures, by performing a variable-length coding process on the coefficient sequence treated with the quantization process, the inter prediction mode flag, the picture type information, and the co-located reference direction flag.

Figure 3:
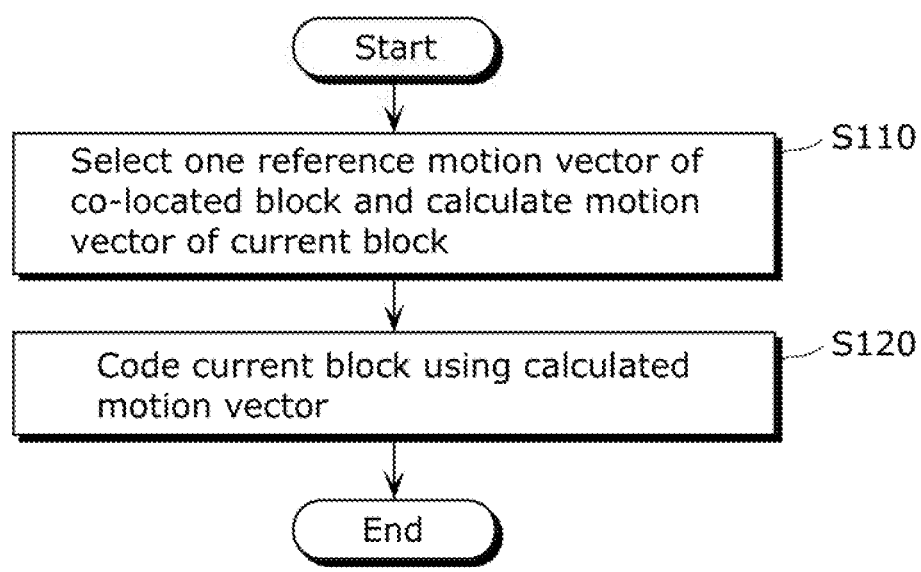
FIG. 3 shows an outline of a process flow of the picture coding method according to Embodiment 1 of the present invention.

FIG. 3 shows an outline of a process flow of the picture coding method according to this embodiment of the present invention.

The temporal direct vector calculation unit 113 selects one of the reference motion vectors of the co-located block and calculates a motion vector of the current block (to be processed), using the selected one of the reference motion vectors (Step S110). It is to be noted that Step 110 corresponds to the motion vector calculation method according to an implementation of the present invention. Specifically, when the co-located block has two reference motion vectors, the temporal direct vector calculation unit 113 selects one of the two reference motion vectors based on whether the co-located block is located, in display time order, before the current block (to be processed) (that is, the co-located block is the forward reference block) or after the current block (to be processed) (that is, the co-located block is the backward reference block), and when the co-located block has only one reference motion vector, the temporal direct vector calculation unit 113 selects the one reference motion vector. For example, in the case where the co-located block is the forward reference block having two or more reference motion vectors, the temporal direct vector calculation unit 113 derives a motion vector of the current block in temporal direct using the backward reference motion vector. On the other hand, in the case where the co-located block is the backward reference block having two or more reference motion vectors, the temporal direct vector calculation unit 113 derives a motion vector of the current block in temporal direct using the forward reference motion vector. It is to be noted that the motion vector derived in temporal direct is referred to as a temporal direct vector.

Here, the co-located block can be determined as follows. That is, the co-located reference direction determination unit 114 determines which one of the forward reference block and the backward reference block will be the co-located block, when the motion vector of the current block is derived in temporal direct. Furthermore, for example, the co-located reference direction determination unit 114 may generate, for each picture, the co-located reference direction flag indicating whether the co-located block is the forward reference block or the backward reference block, and add the generated co-located reference direction flag to the picture. It is to be noted that the addition of the co-located reference direction flag is not limited to the addition in units of pictures and may be addition in units of slices included in the pictures.

Next, the picture coding apparatus 100 codes the current block (to be processed) using the motion vector calculated by the temporal direct vector calculation unit 113 (Step S120). Specifically, the inter prediction unit 110 generates prediction picture data using the motion vector calculated by the temporal direct vector calculation unit 113 (Step S120). For example, the inter prediction control unit 111 compares the motion vector resulting from motion estimation and the motion vector derived in temporal direct, to select the motion vector having higher accuracy. Furthermore, using the selected motion vector, the inter prediction unit 110 performs inter prediction for the current block and thereby generates prediction picture data. Here, the inter prediction control unit 111 determines, as an inter prediction mode, whether to derive a motion vector by motion estimation or in temporal direct, to generate, for each block, an inter prediction mode flag indicating that inter prediction mode, and adds the generated inter prediction mode flag to the current block. It is to be noted that the motion vector resulting from motion estimation is referred to as a motion estimation result vector. Using the prediction picture data generated as above, the current block (to be processed) is coded.

Figure 4:
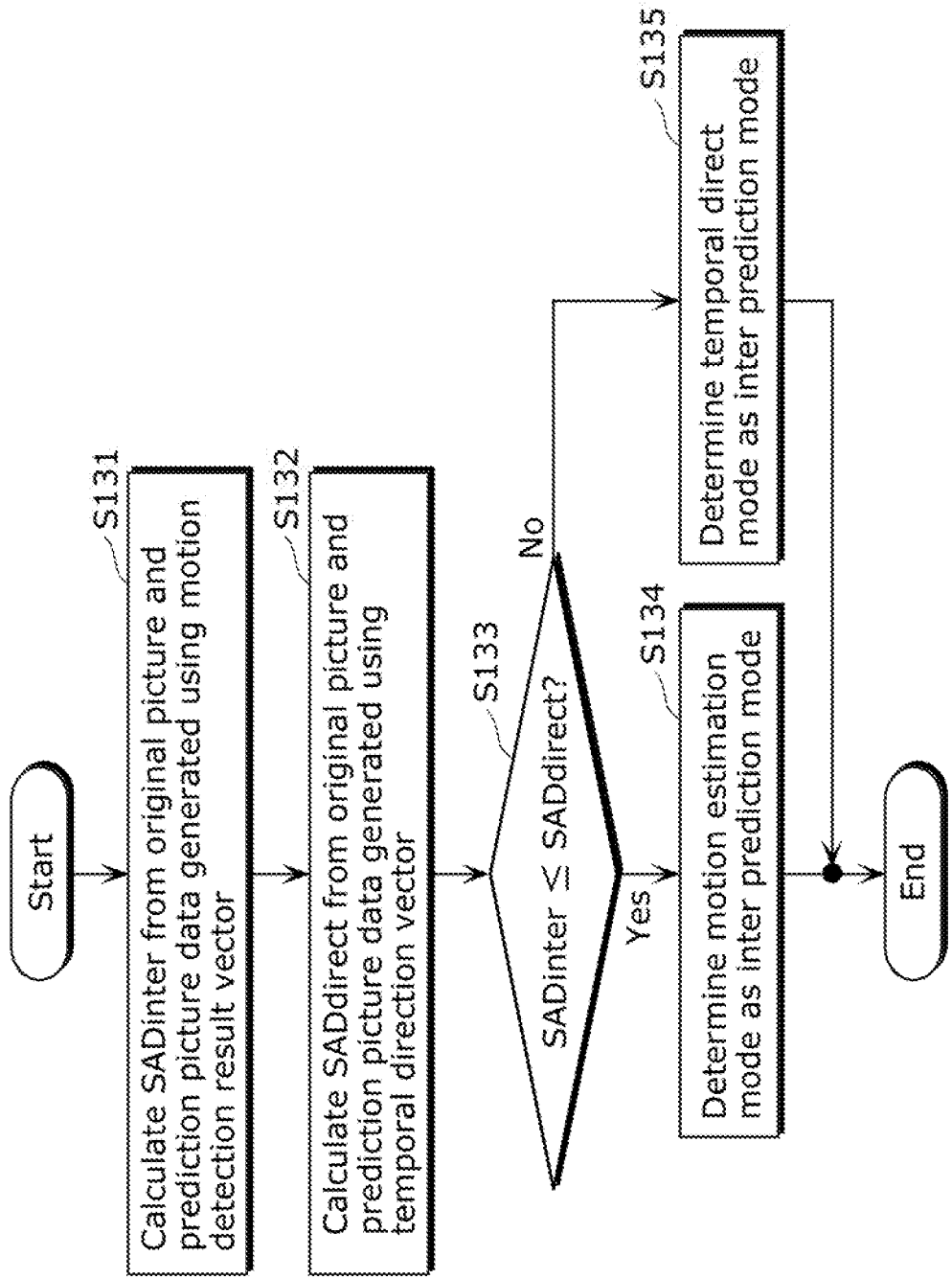
FIG. 4 shows a determination flow of an inter prediction control unit in an inter prediction mode according to Embodiment 1 of the present invention.

FIG. 4 shows a determination flow of the inter prediction control unit 111 in the inter prediction mode.

The inter prediction control unit 111 calculates SADinter that is information on a difference between the original picture (the current block) and the prediction picture data generated using the motion vector resulting from motion estimation (Step S131). Here, a sum of absolute difference (SAD) represents a sum of absolute values of differences in respective pixels between the original picture and the prediction picture data. Furthermore, SADinter represents SAD between the original picture and the prediction picture data generated using the motion vector resulted from motion estimation. The inter prediction control unit 111 calculates SADdirect that is information on a difference between the original picture and the prediction picture data generated using the motion vector derived in temporal direct (Step S132). Here, SADdirect represents SAD between the original picture and the prediction picture data generated using the motion vector derived in temporal direct.

Next, the inter prediction control unit 111 compares SADinter and SADdirect (Step S133). Here, when SADinter is smaller, that is, the motion estimation result vector has higher accuracy (Yes in Step S133), the inter prediction control unit 111 determines the use of a motion estimation mode as the inter prediction mode (Step S134). On the other hand, when SADdirect is smaller, that is, the temporal direct vector has higher accuracy (No in Step S133), the inter prediction control unit 111 determines the use of a temporal direct mode as the inter prediction mode (Step S135).

At the end, the inter prediction control unit 111 generates, for each block, the inter prediction mode flag indicating the determined inter prediction mode, and adds the generated inter prediction mode flag to the current block.

Although whether to use the temporal direct mode is determined using SAD in this embodiment, it is possible to use, for example, SSD that is a sum of square differences in respective pixels between the original picture and the prediction picture data.

Figure 5:
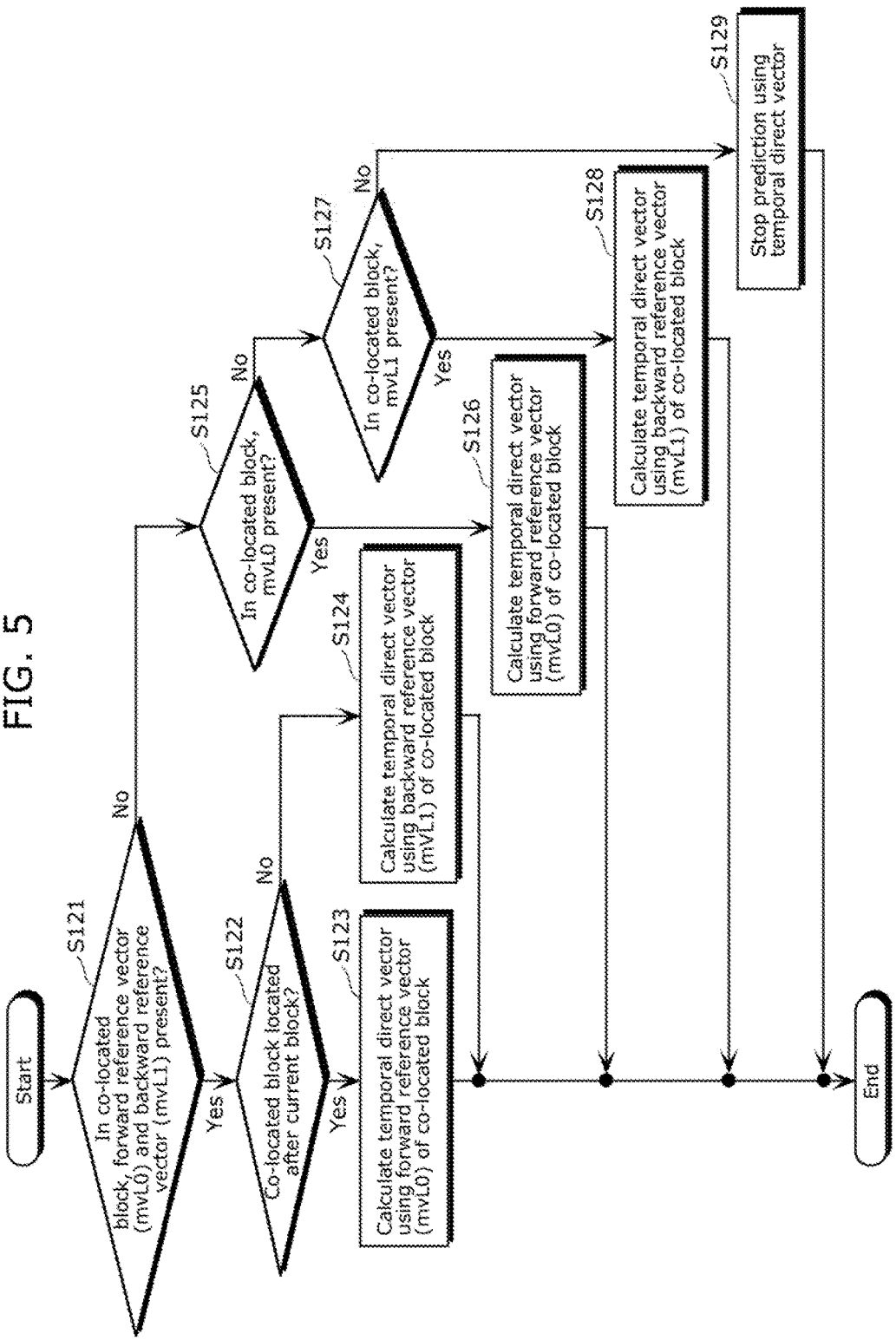
FIG. 5 shows a detailed process flow in Step S110 of FIG. 3 according to Embodiment 1 of the present invention.

FIG. 5 shows a detailed process flow in Step S110 of FIG. 3. The following describes about FIG. 5. It is to be noted that FIG. 5 shows an example of the motion vector calculation unit according to the present invention.

First, the temporal direct vector calculation unit 113 determines whether the co-located block has two or more reference motion vectors, that is, has at least the forward reference motion vector (mvL0) and the backward reference motion vector (mvL1) (Step S121). When it is determined in Step S121 that the co-located block has two or more reference motion vectors (Yes in Step S121), the temporal direct vector calculation unit 113 determines whether or not the co-located block is located after the current block, that is, whether or not the co-located block is the backward reference block (Step S122). When the co-located block is the backward reference block (Yes in Step S122), the temporal direct vector calculation unit 113 derives a motion vector of the current block in temporal direct using the forward reference motion vector mvL0 of the co-located block (Step S123). On the other hand, when the co-located block is the forward reference block (No in Step S122), the temporal direct vector calculation unit 113 derives a motion vector of the current block in temporal direct using the backward reference motion vector mvL1 of the co-located block (Step S124).

Furthermore, when it is determined in Step S121 that the co-located block has only one of the forward reference motion vector mvL0 and the backward reference motion vector mvL1 (No in Step S121), the temporal direct vector calculation unit 113 determines whether or not the co-located block has the forward reference motion vector mvL0 (Step S125). When it is determined in Step S125 that the co-located block has the forward reference motion vector mvL0 (Yes in Step S125), the temporal direct vector calculation unit 113 derives a motion vector of the current block in temporal direct using the forward reference motion vector mvL0 of the co-located block (Step S126). On the other hand, when it is determined in Step S125 that the co-located block has no forward reference motion vector mvL0 (No in Step S125), the temporal direct vector calculation unit 113 determines whether or not the co-located block has the backward reference motion vector mvL1 (Step S127).

Here, when it is determined in Step S127 that the co-located block has the backward reference motion vector mvL1, the temporal direct vector calculation unit 113 derives a motion vector of the current block in temporal direct using the backward reference motion vector mvL1 of the co-located block (Step S128). On the other hand, when it is determined in Step S127 that the co-located block has no backward reference motion vector mvL1 (No in Step S127), the temporal direct vector calculation unit 113 stops the derivation of a motion vector of the current block in temporal direct. Alternatively, the temporal direct vector calculation unit 113 derives a motion vector of the current block in temporal direct assuming that the reference motion vector of the co-located block is 0 (Step S129).

In the process flow of FIG. 5, it is determined in S125 whether or not the co-located block has the forward reference motion vector mvL0, and it is determined in Step S127 whether or not the co-located block has the backward reference motion vector mvL1, but the present invention is not limited to this flow. For example, whether or not the co-located block has the forward reference motion vector mvL0 may be determined after determination on whether or not the co-located block has the backward reference motion vector mvL1. Furthermore, as described above, (i) when the co-located block has two reference motion vectors, the temporal direct vector calculation unit 113 selects one of the two reference motion vectors which is to be used in temporal direct, according to the position of the co-located block, (ii) when the co-located block has only one reference motion vector, the temporal direct vector calculation unit 113 selects the one reference motion vector as the motion vector to be used in temporal direct, and (iii) when the co-located block has no reference motion vector, the temporal direct vector calculation unit 113 stops the derivation of a motion vector in temporal direct. Thus, it is sufficient that, according to each of the above cases, the temporal direct vector calculation unit 113 performs a process which corresponds to the case, and the determinations (such as Steps S121, S122, S125, and S127) on which of the cases applies to the status of the co-located block may be performed in any order.

Next, a method of deriving a motion vector in temporal direct is described in detail.

Figure 6:
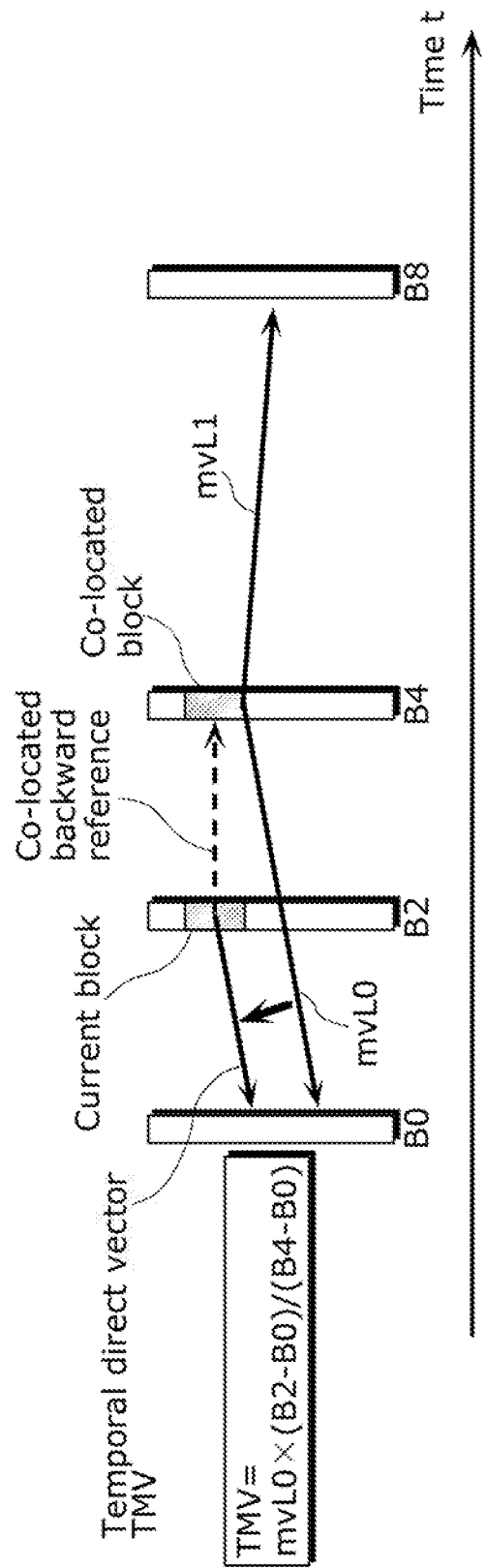
FIG. 6 shows an example of a method of deriving a motion vector (a temporal direct vector) in temporal direct according to Embodiment 1 of the present invention.

FIG. 6 shows an example of a method of deriving a motion vector (a temporal direct vector) in temporal direct according to this embodiment. The co-located block is the backward reference block and has the forward reference motion vector mvL0 and the backward reference motion vector mvL1. In this case, using the forward reference motion vector mvL0, the temporal direct vector calculation unit 113 derives a motion vector (TMV) of the current block by the following calculation expression (Expression 1):

$$TMV = mvL0 \times (B2-B0)/(B4-B-0) \quad \text{(Expression 1)}$$

Here, (B2−B0) represents information on a time difference in display time between a picture B2 and a picture B0, and (B4−B0) represents information on a time difference in display time between a picture B4 and the picture B0.

Figure 7:
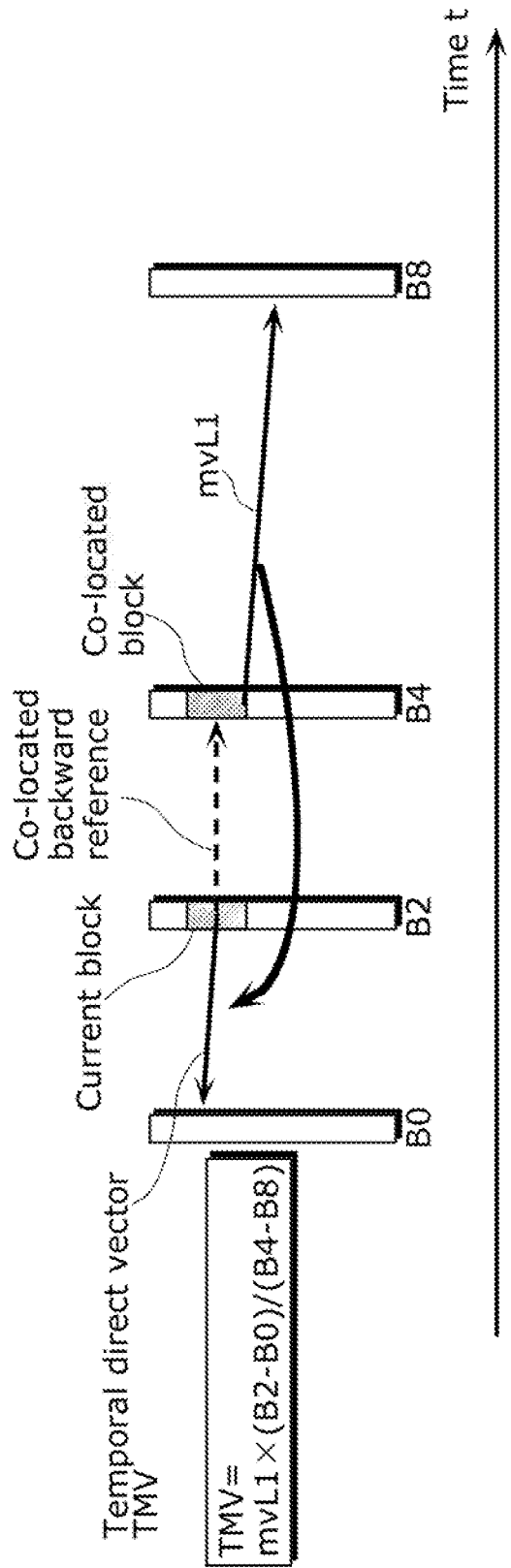
FIG. 7 shows another example of the method of deriving a motion vector (a temporal direct vector) in temporal direct according to Embodiment 1 of the present invention.

FIG. 7 shows another example of the method of deriving a motion vector (a temporal direct vector) in temporal direct according to this embodiment. The co-located block is the backward reference block and has only the backward reference motion vector mvL1. In this case, using the backward reference motion vector mvL1, the temporal direct vector calculation unit 113 derives a motion vector (TMV) of the current block by the following calculation expression (Expression 2):

$$TMV = mvL1 \times (B2-B0)/(B4-B8) \quad \text{(Expression 2)}$$

Figure 8:
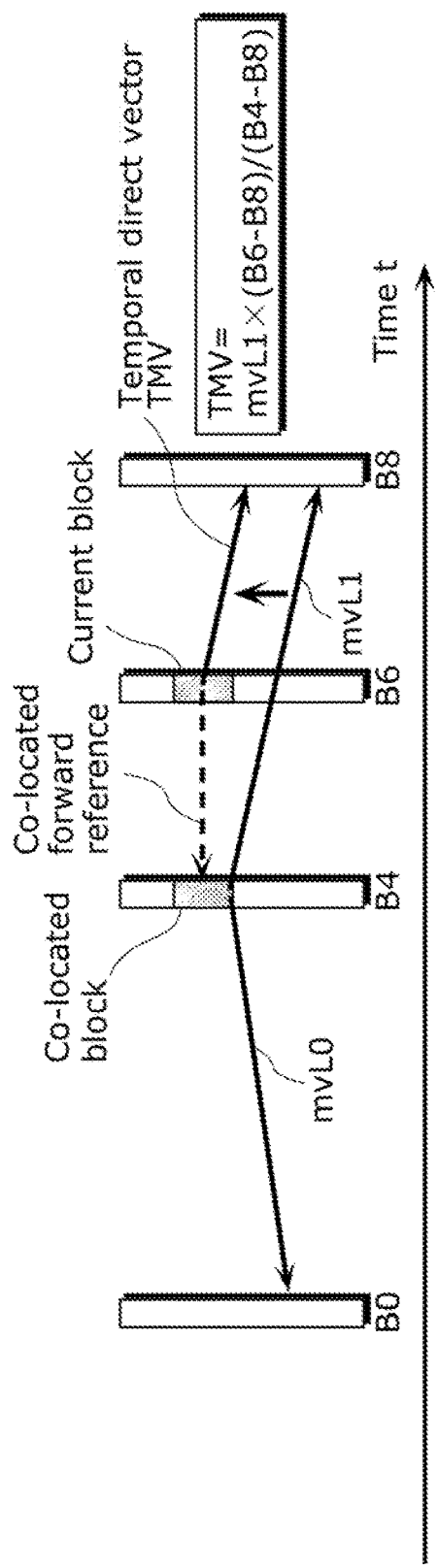
FIG. 8 shows another example of the method of deriving a motion vector (a temporal direct vector) in temporal direct according to Embodiment 1 of the present invention.

FIG. 8 shows another example of the method of deriving a motion vector (a temporal direct vector) in temporal direct according to this embodiment. The co-located block is the forward reference block and has the forward reference motion vector mvL0 and the backward reference motion vector mvL1. In this case, using the backward reference motion vector mvL1, the temporal direct vector calculation unit 113 derives a motion vector (TMV) of the current block by the following calculation expression (Expression 3):

$$TMV = mvL1 \times (B6-B8)/(B4-B8) \quad \text{(Expression 3)}$$

Figure 9:
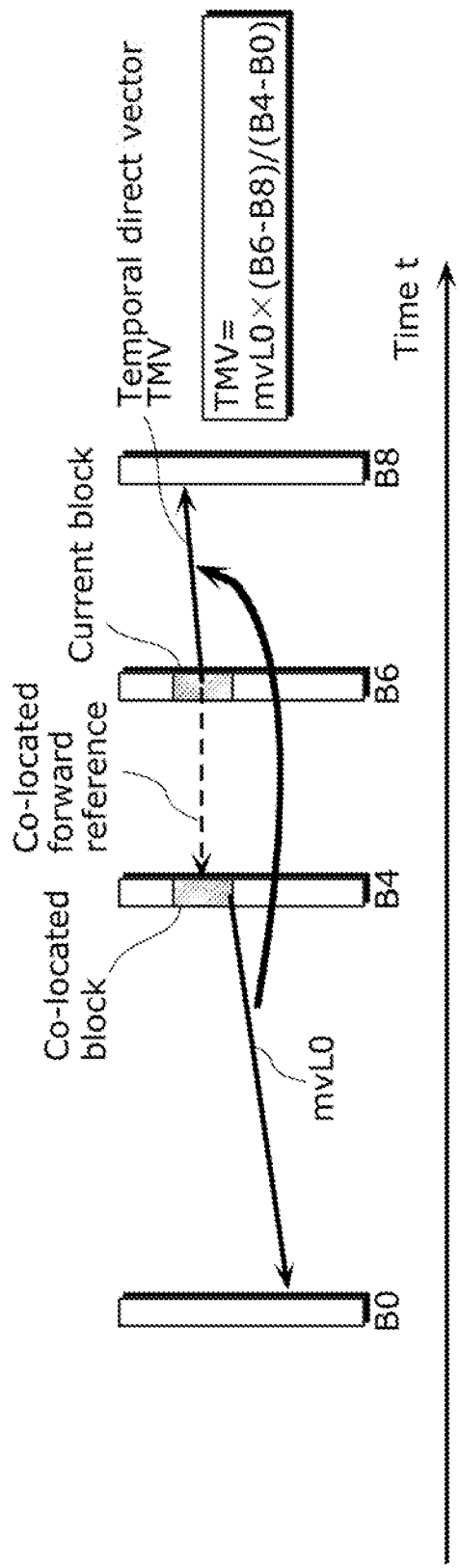
FIG. 9 shows another example of the method of deriving a motion vector (a temporal direct vector) in temporal direct according to Embodiment 1 of the present invention.

FIG. 9 shows another example of the method of deriving a motion vector (a temporal direct vector) in temporal direct according to this embodiment. The co-located block is the forward reference block and has only the forward reference motion vector mvL0. In this case, using the forward reference motion vector mvL0, the temporal direct vector calculation unit 113 derives a motion vector (TMV) of the current block by the following calculation expression (Expression 4):

$$TMV = mvL0 \times (B6-B8)/(B4-B0) \quad \text{(Expression 4)}$$

Thus, according to this embodiment, when the co-located block has two or more reference motion vectors, the motion vector most suitable for the current block can be derived, which allows an increase in the compression rate. Especially, when the co-located block is the forward reference block, the use of the backward reference motion vector allows a reduction in the prediction error. In this case, the backward reference motion vector is a motion vector directed from a picture including the co-located block to a picture including the current block. Accordingly, the motion vector derived from the backward reference motion vector has a higher probability of approximating the most suitable motion vector, which reduces the prediction error. On the other hand, the forward reference motion vector is a motion vector in a direction opposite to the direction from the picture including the co-located block to the picture including the current block. Accordingly, the motion vector derived from the forward reference motion vector has a lower probability of approximating the most suitable motion vector, which increases the prediction error. Likewise, also in the case where the co-located block is the backward reference block, the motion vector derived from the forward reference motion vector has a higher probability of approximating the most suitable motion vector, with the result that the use of the forward reference motion vector allows a reduction in the prediction error.

Embodiment 2

In this embodiment, when the co-located block has two or more reference motion vectors, it is determined to use, in temporal direct, a reference motion vector which refers to a picture temporally close to the picture including the co-located block, that is, a reference motion vector having a short temporal distance to the picture including the co-located block. In this regard, this embodiment is different in structure from other embodiments. Here, the temporal distance is determined according to the number of pictures in display time order between the picture including the co-located block and the reference motion picture to which the co-located block refers. Specifically, this embodiment is different from Embodiment 1 in the process in Step S110 in the process flow shown in FIG. 3.

Figure 10:
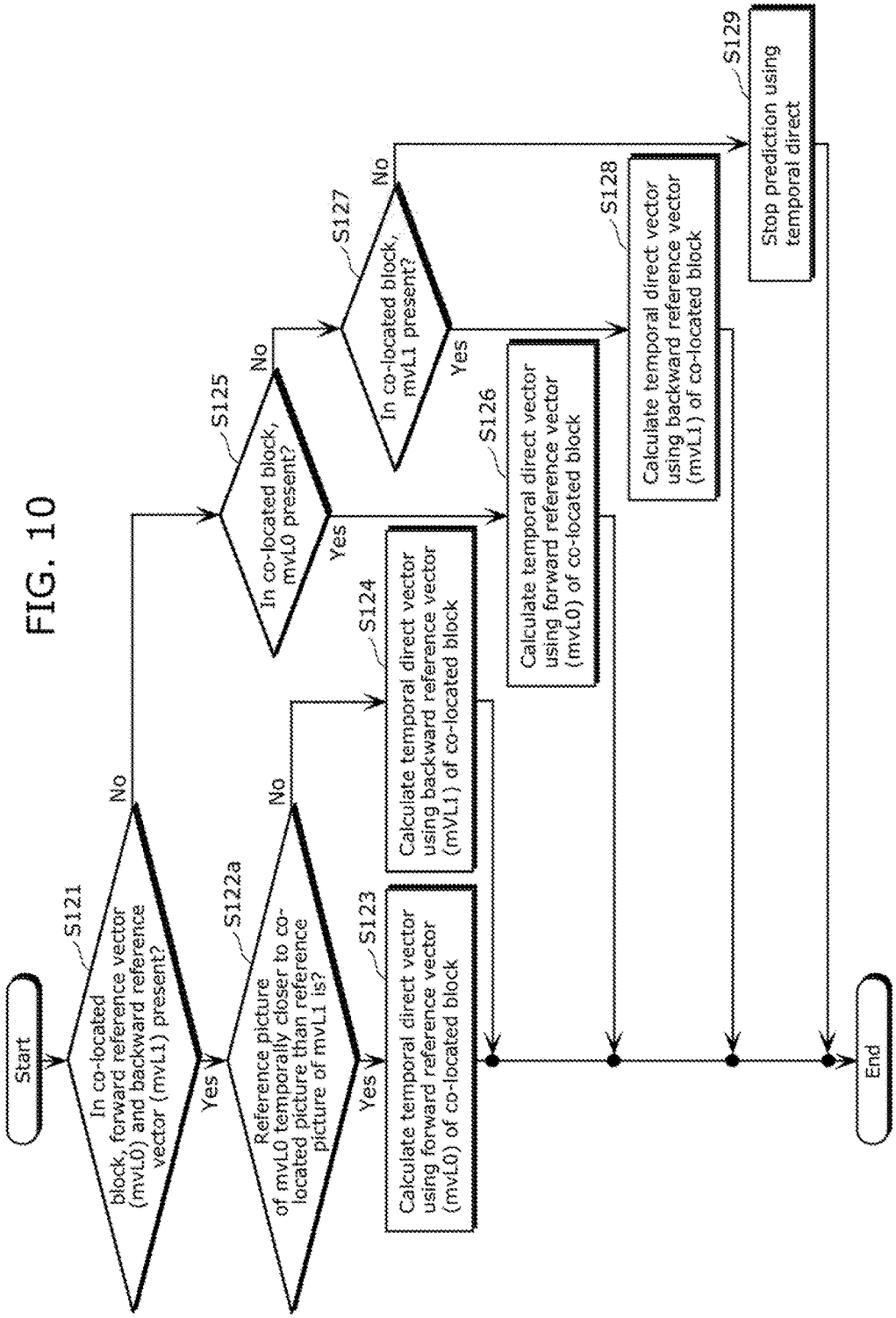
FIG. 10 shows a detailed process flow of calculation of a temporal direct vector according to Embodiment 2 of the present invention.

FIG. 10 shows a detailed process flow of calculation of a temporal direct vector according to this embodiment. The following describes about FIG. 10.

First, the temporal direct vector calculation unit 113 determines whether the co-located block has two or more reference motion vectors, that is, has at least the forward reference motion vector mvL0 and the backward reference motion vector mvL1 (Step S121). When it is determined in Step S121 that the co-located block has two or more reference motion vectors (Yes in Step S121), the temporal direct vector calculation unit 113 determines whether or not a reference picture to which the forward reference motion vector mvL0 refers is temporally closer to the picture including the co-located block (the co-located picture) than a reference picture to which the backward reference motion vector mvL1 refers is (Step S122a). In short, the temporal direct vector calculation unit 113 determines which one of the forward reference motion vector mvL0 and the backward reference motion vector mvL1 has a shorter temporal distance. When it is determined in Step S122a that the reference picture to which the forward reference motion vector mvL0 refers is temporally closer to the picture including the co-located block (Yes in Step S122a), the temporal direct vector calculation unit 113 derives a motion vector of the current block in temporal direct using the forward reference motion vector mvL0 of the co-located block (Step S123). On the other hand, when it is determined in Step S122a that the reference picture to which the backward reference motion vector mvL1 refers is temporally closer to the picture including the co-located block (No in Step S122a), the temporal direct vector calculation unit 113 derives a motion vector of the current block in temporal direct using the backward reference motion vector mvL1 of the co-located block (Step S124).

Furthermore, when it is determined in Step S121 that the co-located block has only one of the forward reference motion vector mvL0 and the backward reference motion vector mvL1 (No in Step S121), the temporal direct vector calculation unit 113 determines whether or not the co-located block has the forward reference motion vector (Step S125). When it is determined in Step S125 that the co-located block has the forward reference motion vector (Yes in Step S125), the temporal direct vector calculation unit 113 derives a motion vector of the current block in temporal direct using the forward reference motion vector mvL0 of the co-located block (Step S126). On the other hand, when it is determined in Step S125 that the co-located block has no forward reference motion vector mvL0 (No in Step S125), the temporal direct vector calculation unit 113 determines whether or not the co-located block has the backward reference motion vector mvL1 (Step S127).

Here, when it is determined in Step S127 that the co-located block has the backward reference motion vector mvL1 (Yes in Step S127), the temporal direct vector calculation unit 113 derives a motion vector of the current block in temporal direct using the backward reference motion vector mvL1 of the co-located block (Step S128). On the other hand, when it is determined in Step S127 that the co-located block has no backward reference motion vector mvL1 (No in Step S127), the temporal direct vector calculation unit 113 stops the derivation of a motion vector of the current block in temporal direct. Alternatively, the temporal direct vector calculation unit 113 derives a motion vector of the current block in temporal direct assuming that the reference motion vector of the co-located block is 0 (Step S129). That is, the motion vector of the current block is 0.

Next, a method of deriving a motion vector in temporal direct according to this embodiment is described in detail.

Figure 11:
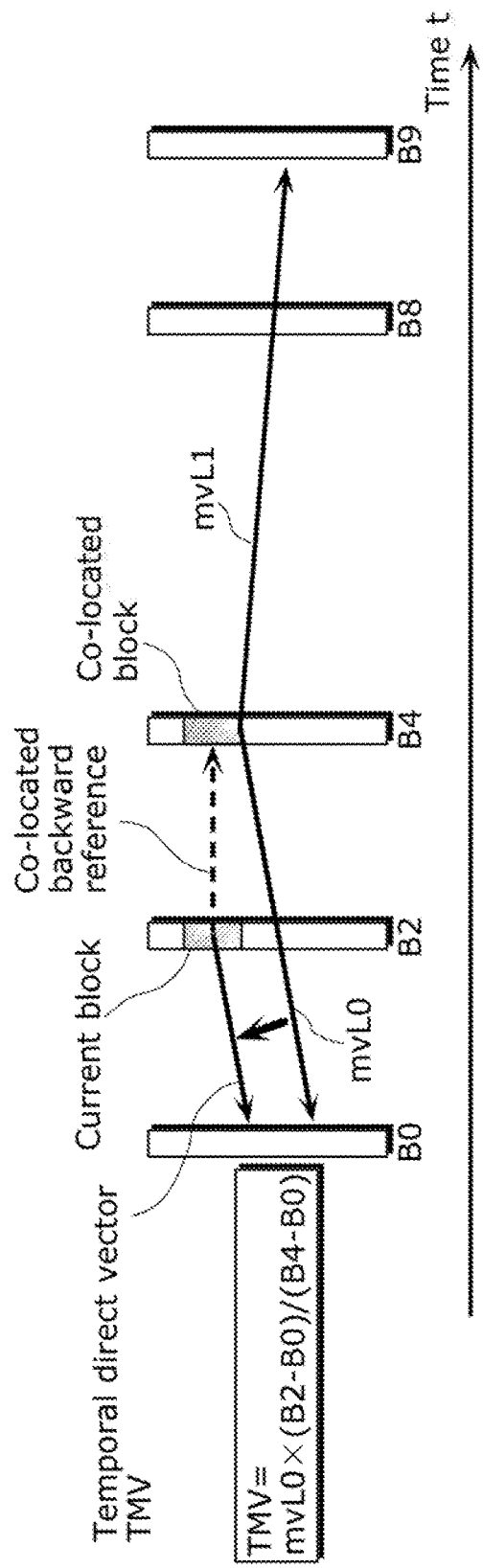
FIG. 11 shows an example of a method of deriving a motion vector (a temporal direct vector) in temporal direct according to Embodiment 2 of the present invention.

FIG. 11 shows an example of the method of deriving a motion vector (a temporal direct vector) in temporal direct according to this embodiment. The co-located block has the forward reference motion vector mvL0 and the backward reference motion vector mvL1. The reference picture to which the forward reference motion vector mvL0 refers is temporally closer to the picture including the co-located block than the reference picture to which the backward reference motion vector mvL1 refers is. In this case, using the forward reference motion vector mvL0, the temporal direct vector calculation unit 113 derives a motion vector (TMV) of the current block by the following calculation expression (Expression 5):

$$TMV = mvL0 \times (B2-B0)/(B4-B0) \qquad \text{(Expression 5)}$$

Figure 12:
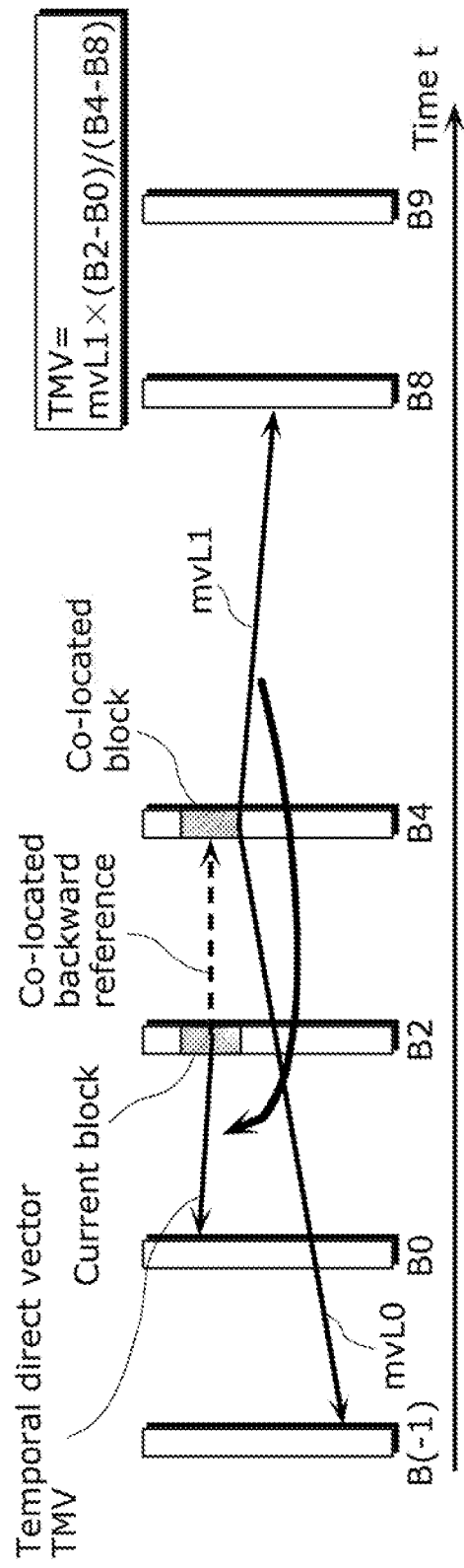
FIG. 12 shows another example of the method of deriving a motion vector (a temporal direct vector) in temporal direct according to Embodiment 2 of the present invention.

FIG. 12 shows another example of the method of deriving a motion vector (a temporal direct vector) in temporal direct according to this embodiment. The co-located block has the forward reference motion vector mvL0 and the backward reference motion vector mvL1. The reference picture to which the backward reference motion vector mvL1 refers is temporally closer to the picture including the co-located block than the reference picture to which the forward reference motion vector mvL0 refers is. In this case, using the backward reference motion vector mvL1, the temporal direct vector calculation unit 113 derives a motion vector (TMV) of the current block by the following calculation expression (Expression 6):

TMV=mvL1×(B2−B0)/(B4−B8)  (Expression 6)

Thus, according to this embodiment, when the co-located block has two or more reference motion vectors, the motion vector most suitable for the current block can be derived, which allows an increase in the compression rate. Specifically, by using the reference motion vector which refers to a picture temporally close to the picture including the co-located block, the motion vector derived from that reference motion vector has a higher probability of approximating the most suitable motion vector, which allows a reduction in the prediction error.

It is to be noted that this embodiment can be combined with other embodiments. For example, Step S122 shown in FIG. 5 according to Embodiment 1 may be combined with Step 122a shown in FIG. 10 according to this embodiment. In this case, Step 122a shown in FIG. 10 according to this embodiment is given priority over Step S122 shown in FIG. 5 according to Embodiment 1. Specifically, first, a temporal distance between two or more reference motion vectors is determined to select a motion vector having a short temporal distance. Here, when the two or more reference motion vectors have an equal temporal distance, a reference motion vector is selected based on whether the co-located block is the forward reference block or the backward reference block. Since the impact on the motion vector is larger in Step 122a according to this embodiment, prioritizing the temporal distance of the reference motion vector allows a selection of a more suitable reference motion vector.

Embodiment 3

In this embodiment, when the co-located block has two or more reference motion vectors, it is determined to use, in temporal direct, a reference motion vector having a smaller magnitude. In this regard, this embodiment is different in structure from other embodiments. Here, the magnitude of the motion vector means the absolute value of the motion vector. Specifically, this embodiment is different from Embodiment 1 in the process in Step S110 in the process flow shown in FIG. 3.

Figure 13:
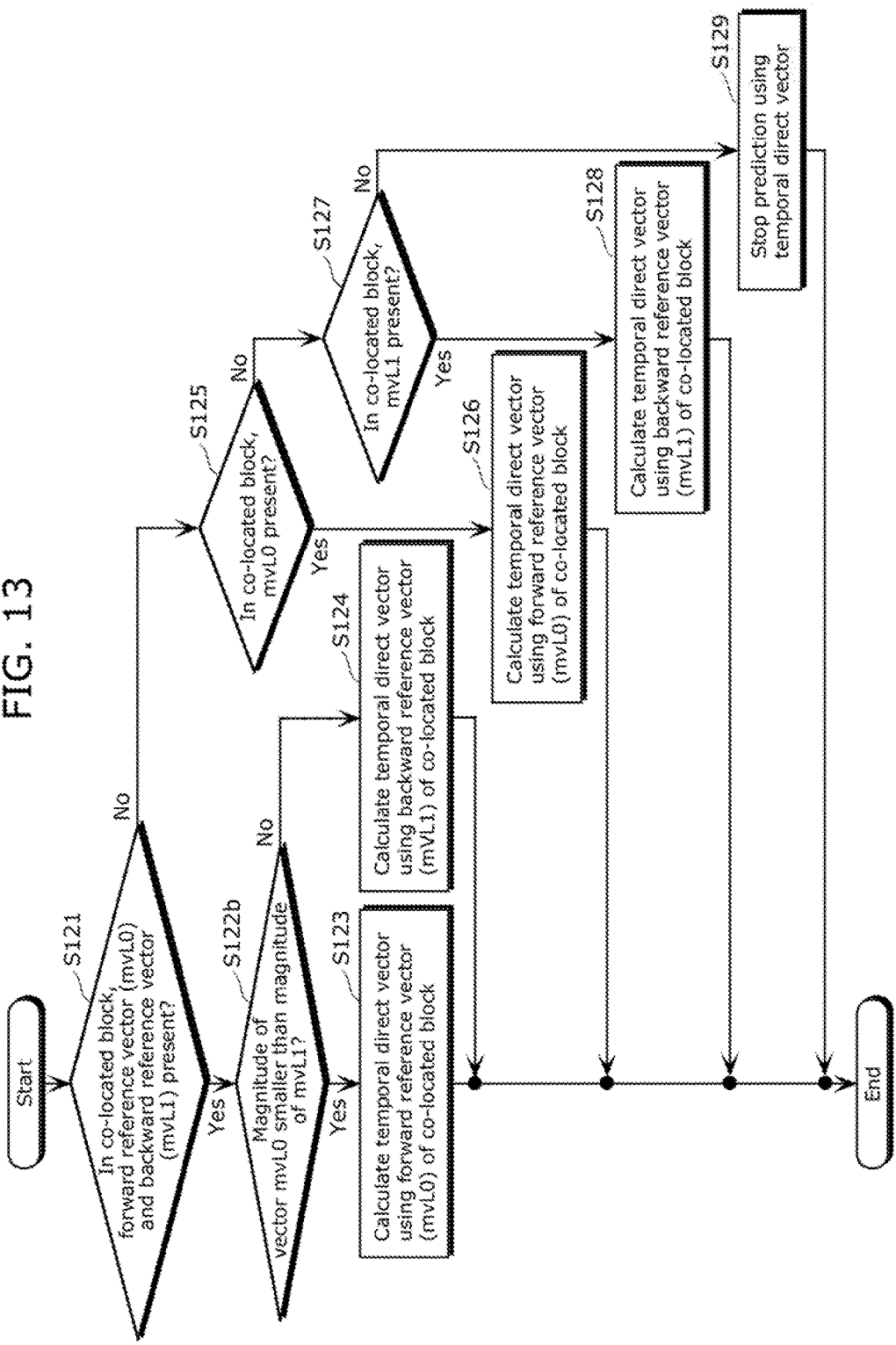
FIG. 13 shows a detailed process flow of calculation of a temporal direct vector according to Embodiment 3 of the present invention.

FIG. 13 shows a detailed process flow of calculation of a temporal direct vector according to this embodiment. The following describes about FIG. 13.

First, the temporal direct vector calculation unit 113 determines whether or not the co-located block has two or more reference motion vectors, that is, has at least the forward reference motion vector mvL0 and the backward reference motion vector mvL1 (Step S121). When it is determined in Step S121 that the co-located block has two or more reference motion vectors (Yes in Step S121), the temporal direct vector calculation unit 113 determines whether or not the magnitude of the forward reference motion vector mvL0 is smaller than the magnitude of the backward reference motion vector mvL1 (Step S122b). When it is determined in Step S122b that the magnitude of the forward reference motion vector mvL0 is smaller (Yes in Step S122b), the temporal direct vector calculation unit 113 derives a motion vector of the current block in temporal direct using the forward reference motion vector mvL0 of the co-located block (Step S123). On the other hand, when it is determined in Step S122b that the magnitude of the backward reference motion vector mvL1 is smaller (No in Step S122b), the temporal direct vector calculation unit 113 derives a motion vector of the current block in temporal direct using the backward reference motion vector mvL1 of the co-located block (Step S124).

Furthermore, when it is determined in Step S121 that the co-located block has only one of the forward reference motion vector mvL0 and the backward reference motion vector mvL1 (No in Step S121), the temporal direct vector calculation unit 113 determines whether or not the co-located block has the forward reference motion vector (Step S125). When it is determined in Step S125 that the co-located block has the forward reference motion vector (Yes in Step S125), the temporal direct vector calculation unit 113 derives a motion vector of the current block in temporal direct using the forward reference motion vector mvL0 of the co-located block (Step S126). On the other hand, when it is determined in Step S125 that the co-located block has no forward reference motion vector mvL0 (No in Step S125), the temporal direct vector calculation unit 113 determines whether or not the co-located block has the backward reference motion vector mvL1 (Step S127).

Here, when it is determined in Step S127 that the co-located block has the backward reference motion vector mvL1 (Yes in Step S127), the temporal direct vector calculation unit 113 derives a motion vector of the current block in temporal direct using the backward reference motion vector mvL1 of the co-located block (Step S128). On the other hand, when it is determined in Step S127 that the co-located block has no backward reference motion vector mvL1 (No in Step S127), the temporal direct vector calculation unit 113 stops the derivation of a motion vector of the current block in temporal direct. Alternatively, the temporal direct vector calculation unit 113 derives a motion vector of the current block in temporal direct assuming that the reference motion vector of the co-located block is 0 (Step S129). That is, the motion vector of the current block is 0.

Thus, according to this embodiment, when the co-located block has two or more reference motion vectors, the motion vector most suitable for the current block can be derived, which allows an increase in the compression rate.

It is to be noted that this embodiment can be combined with other embodiments. For example, Step S122 shown in FIG. 5 according to Embodiment 1 may be combined with Step 122b shown in FIG. 13 according to this embodiment. In this case, Step 122b shown in FIG. 13 according to this embodiment is given priority over Step S122 shown in FIG. 5 according to Embodiment 1. Specifically, first, the magnitudes of two or more reference motion vectors are determined to select a motion vector having a small magnitude. Here, when the two or more reference motion vectors have an equal magnitude, a reference motion vector is selected based on whether the co-located block is the forward reference block or the backward reference block. Since the impact on the motion vector is larger in Step 122b according to this embodiment, prioritizing the magnitude of the reference motion vector allows a selection of a more suitable reference motion vector.

Embodiment 4

In this embodiment, in the case where the co-located block indicated by the co-locate reference direction flag has no reference motion vector and the motion vector of the current block cannot be derived in temporal direct, that is, in the case where the motion vector is 0, the co-located block is changed, and a motion vector of the current block is calculated to perform inter prediction.

First, in Step S110 of FIG. 3, the co-located reference direction determination unit 114 determines which one of the forward reference block and the backward reference block will be the co-located block. When it is determined that the forward reference block will be the co-located block, the co-located reference direction determination unit 114 sets a co-located backward reference priority flag (the co-located reference direction flag) at 0. On the other hand, when it is determined that the backward reference block will be the co-located block, the co-located reference direction determination unit 114 sets the co-located backward reference priority flag at 1. Here, the co-located reference direction determination unit 114 generates the co-located backward reference priority flag for each picture and then adds the generated co-located backward reference priority flag to the picture to be coded.

Since the co-located backward reference priority flag is generated in units of pictures, there may be a case where the co-located block corresponding to a certain block included in the current picture has neither the forward reference motion vector nor the backward reference motion vector. In this case, the temporal direct vector calculation unit 113 changes the co-located block to derive a more suitable motion vector.

Figure 14:
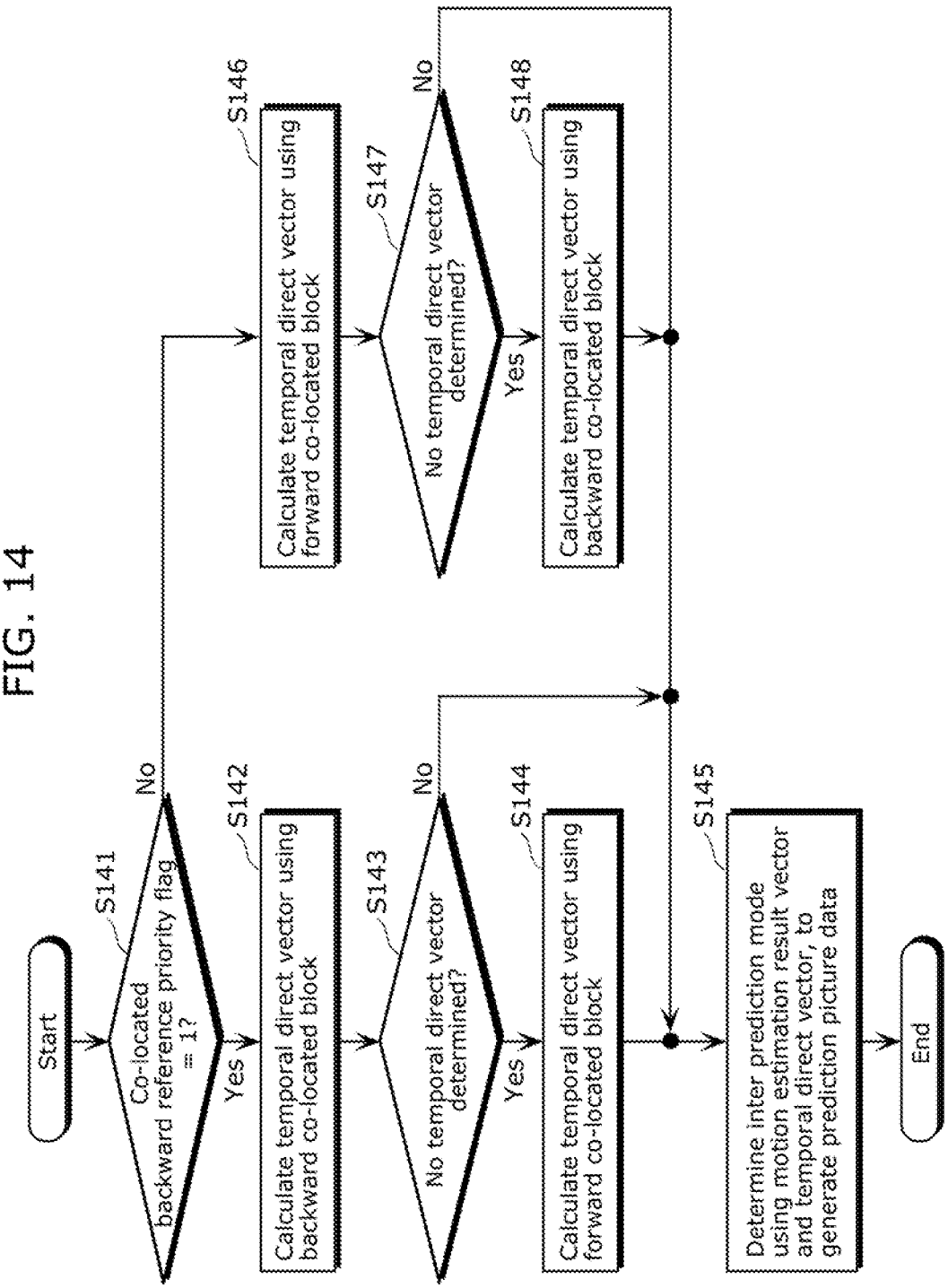
FIG. 14 shows a detailed process flow in Steps S110 and S120 of FIG. 3 according to Embodiment 4 of the present invention.

FIG. 14 shows a detailed process flow in Steps S110 and S120 of FIG. 3 according to this embodiment. The following describes about FIG. 14.

The temporal direct vector calculation unit 113 determines whether or not the co-located backward reference priority flag is 1, that is, whether or not the backward reference block is to be prioritized (Step S141). When the co-located backward reference priority flag is 1 (Yes in Step S141), the temporal direct vector calculation unit 113 attempts to derive a motion vector of the current block in temporal direct using the co-located block which is the backward reference block (Step S142). The temporal direct vector calculation unit 113 determines whether or not the motion vector of the current block has been derived in Step S142, that is, whether or not the motion vector is 0 (Step S143). When the motion vector has not been derived (Yes in Step S143), the temporal direct vector calculation unit 113 derives a motion vector of the current block in temporal direct using the co-located block which is the forward reference block (Step S144).

On the other hand, when the co-located backward reference priority flag is 0 (No in Step S141), the temporal direct vector calculation unit 113 attempts to derive a motion vector of the current block in temporal direct using the co-located block which is the forward reference block (Step S146). The temporal direct vector calculation unit 113 determines whether or not the motion vector of the current block has been derived in Step S146, that is, whether or not the motion vector is 0 (Step S147). When the motion vector has not been derived (Yes in Step S147), the temporal direct vector calculation unit 113 derives a motion vector of the current block in temporal direct using the co-located block which is the backward reference block (Step 148).

At the end, the inter prediction control unit 111 compares the motion vector resulting from motion estimation and the motion vector derived in temporal direct, to determine a motion vector having higher accuracy as the motion vector of the current block. In other words, the inter prediction control unit 111 determines the inter prediction mode. Furthermore, the inter prediction unit 110 performs inter prediction using the determined motion vector and thereby generates the prediction picture data (Step S145). At this time, the inter prediction control unit 111 generates, for each block, the inter prediction mode flag indicating the inter prediction mode, and adds the generated inter prediction mode flag to the current block.

Thus, according to this embodiment, in the case where the co-located block indicated by the co-located backward reference priority flag has no reference motion vector, a block in other picture is determined as the co-located block so that a motion vector can be derived. For example, in the case where the backward reference block is the co-located block and the co-located block has no reference motion vector, the forward reference block is determined as the co-located block so that a motion vector can be derived. This allows derivation of a motion vector having higher accuracy.

It is to be noted that this embodiment can be combined with other embodiments. For example, Step S129 of FIG. 5 according to Embodiment 1 is replaced by a step of determining whether or not the co-located block is the backward reference block. Specifically, in the case where the co-located block is the backward reference block, the process in Step S144 of FIG. 14 according to this embodiment is performed, while, in the case where the co-located block is the forward reference block, the process in Step S148 of FIG. 14 according to this embodiment is performed. This allows derivation of a more suitable motion vector. Likewise, Step S129 of FIG. 10 according to Embodiment 2 and Step S129 of FIG. 13 according to Embodiment 3 may be replaced by a step of determining whether or not the co-located block is the backward reference block. Specifically, in the case where the co-located block is the backward reference block, the process in Step S144 of FIG. 14 according to this embodiment is performed, while, in the case where the co-located block is the forward reference block, the process in Step S148 of FIG. 14 according to this embodiment is performed. This allows derivation of a more suitable motion vector.

In addition, when a newly selected co-located block has two or more reference motion vectors, a motion vector is derived in the method described in Embodiments 1, 2, and 3. This allows derivation of a motion vector having higher accuracy.

Embodiment 5

Figure 15:
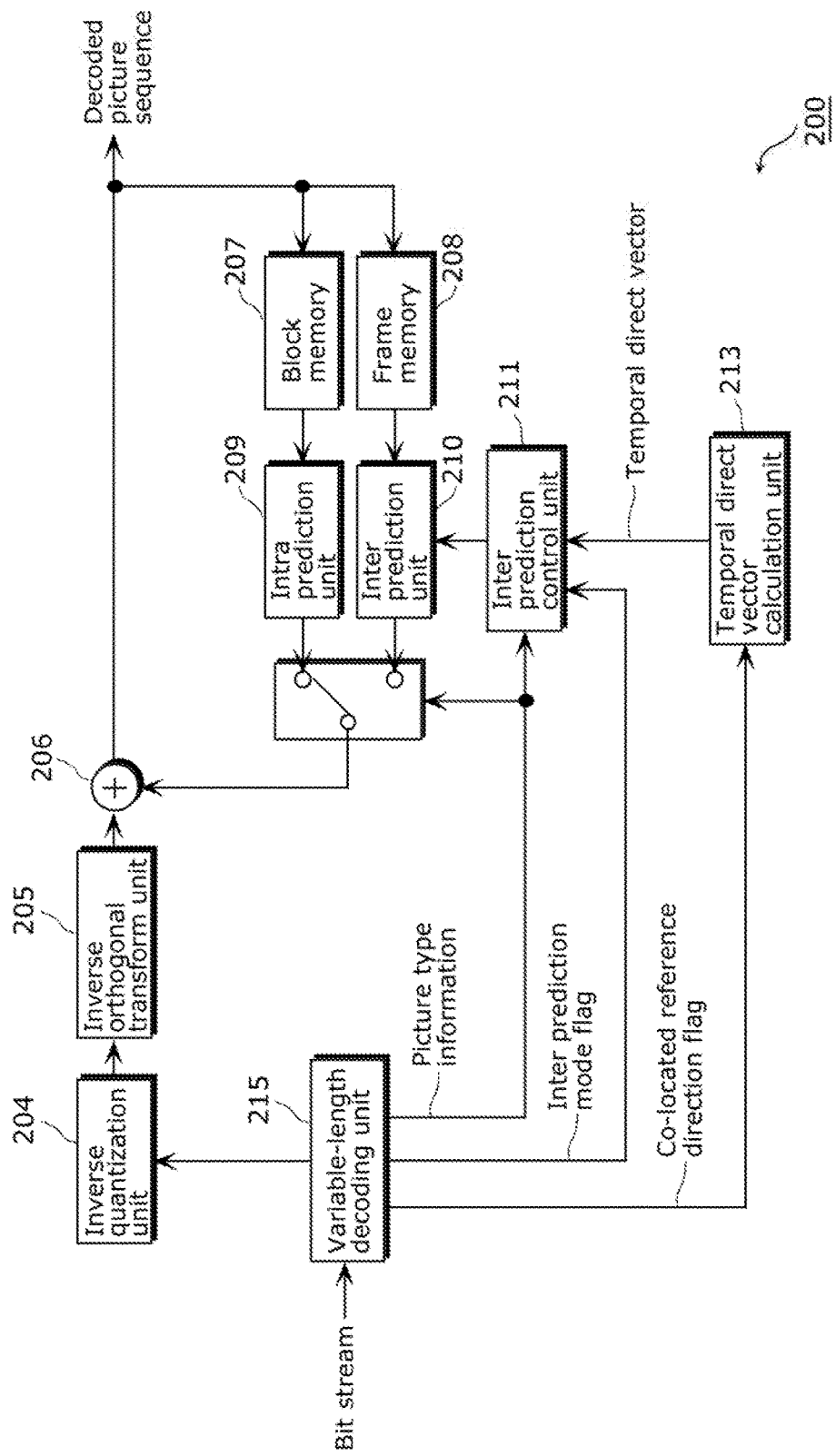
FIG. 15 is a block diagram showing a configuration of a picture decoding apparatus using a picture decoding method according to Embodiment 5 of the present invention.

FIG. 15 is a block diagram showing a structure of a picture decoding apparatus using a picture decoding method according to Embodiment 5 of the present invention.

In this embodiment, a block included in a picture located, in display time order, before a current picture or block to be decoded (to be processed) is referred to as a forward reference block. In this embodiment, a block included in a picture located, in display time order, after the current picture or block to be decoded (to be processed) is referred to as a backward reference block.

A picture decoding apparatus 200 according to this embodiment includes, as shown in FIG. 15, a variable-length decoding unit 215, an inverse quantization unit 204, an inverse orthogonal transform unit 205, a block memory 207, a frame memory 208, an intra prediction unit 209, an inter prediction unit 210, an inter prediction control unit 211, a temporal direct vector calculation unit 213, and an adder 206.

The variable-length decoding unit 215 performs a variable-length decoding process on an input bit stream to generate picture type information, inter prediction mode flag, co-located reference direction flag, and bit streams treated with the variable-length decoding process (coefficient sequences treated with the quantization process).

The inverse quantization unit 204 performs an inverse quantization process on the bit streams treated with the variable-length decoding process. The inverse orthogonal transform unit 205 transforms, from frequency domain into image domain, the bit streams treated with the inverse quantization process, and thereby generates prediction error picture data.

The adder 206 adds the prediction error picture data to the prediction picture data generated by the intra prediction unit 209 or the inter prediction unit 210, and thereby generates a decoded picture sequence that is reconstructed picture data.

The block memory 207 stores the reconstructed picture data in units of blocks, and the frame memory 208 stores the reconstructed picture data in units of frames.

The intra prediction unit 209 performs intra prediction using the reconstructed picture data stored in units of blocks in the block memory 207, and thereby generates prediction error picture data for the current block (to be processed). The inter prediction unit 210 performs inter prediction using the reconstructed picture data stored in units of frames in the frame memory 208, and thereby generates prediction error picture data for the current block.

The inter prediction control unit 211 controls the method of deriving a motion vector in the inter prediction, according to the inter prediction mode flag. In the case where the inter prediction mode flag indicates that a motion vector is to be derived in temporal direct (the temporal direct mode), the inter prediction control unit 211 instructs the inter prediction unit 210 to perform, using a motion vector (temporal direct vector) derived in temporal direct, inter prediction according to that motion vector.

In the case of deriving a motion vector in temporal direct, the temporal direct vector calculation unit 213 determines a co-located block using the co-located reference direction flag and derives a motion vector in temporal direct. The temporal direct vector calculation unit 213 determines the backward reference block as the co-located block when the co-located reference direction flag indicates that the co-located block is the backward reference block. On the other hand, when the co-located reference direction flag indicates that the co-located block is the forward reference block, the temporal direct vector calculation unit 213 determines the forward reference block as the co-located block. In the case where the co-located block has two or more reference motion vectors, the temporal direct vector calculation unit 213 selects a reference motion vector to be used in temporal direct, based on whether the co-located block is the forward reference block or the backward reference block.

For example, in the case where the co-located block is the backward reference block, the temporal direct vector calculation unit 213 uses the forward reference motion vector among the two or more reference motion vectors of the co-located block. On the other hand, in the case where the co-located block is the forward reference block, the temporal direct vector calculation unit 213 uses the backward reference motion vector among the two or more reference motion vectors of the co-located block. In the case where the co-located block has only one of the forward reference motion vector and the backward reference motion vector, the temporal direct vector calculation unit 213 first searches for the forward reference motion vector, and when the co-located block has the forward reference motion vector, the temporal direct vector calculation unit 213 derives a motion vector of the current block in temporal direct using the forward reference motion vector. On the other hand, when the co-located block has no forward reference motion vector, the temporal direct vector calculation unit 213 derives a motion vector of the current block in temporal direct using the backward reference motion vector.

Figure 16:
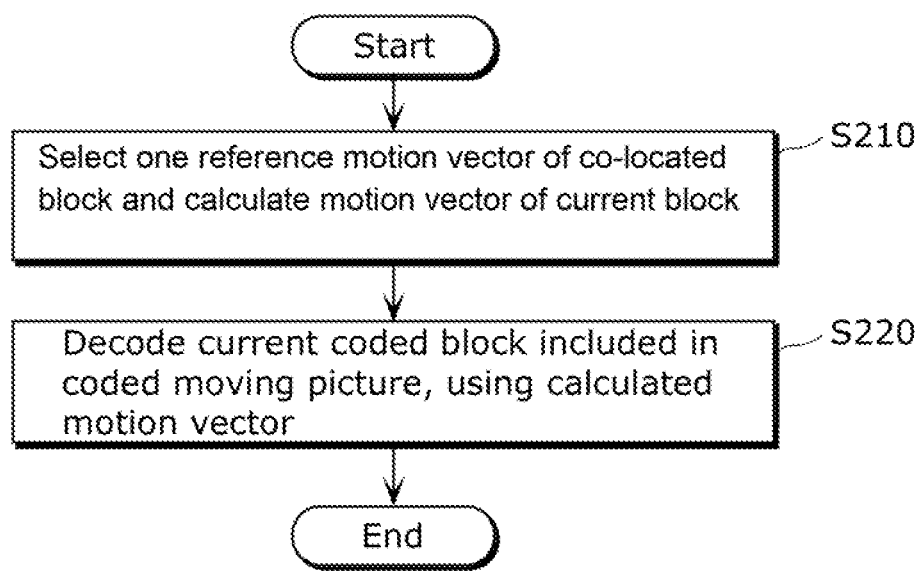
FIG. 16 shows an outline of a process flow of the picture decoding method according to Embodiment 5 of the present invention.

FIG. 16 shows an outline of a process flow of the picture decoding method according to this embodiment.

The temporal direct vector calculation unit 213 selects one of the reference motion vectors of the co-located block and calculates a motion vector of the current block (to be processed), using the selected one of the reference motion vectors (Step S210). It is to be noted that Step 210 corresponds to the motion vector calculation method according to an implementation of the present invention. Specifically, when the co-located block has two reference motion vectors, the temporal direct vector calculation unit 213 selects one of the two reference motion vectors based on whether the co-located block is located, in display time order, before the current block (to be processed) (that is, the co-located block is the forward reference block) or after the current block (to be processed) (that is, the co-located block is the backward reference block), and when the co-located block has only one reference motion vector, the temporal direct vector calculation unit 213 selects the one reference motion vector. For example, when the co-located block has two or more reference motion vectors, the temporal direct vector calculation unit 213 determines based on the co-located reference direction flag which one of the reference motion vectors is to be used. When the co-located reference direction flag indicates the backward reference block as the co-located block, that is, when the co-located block is the backward reference block, the temporal direct vector calculation unit 213 determines to use the forward reference motion vector among the two or more reference motion vectors. On the other hand, when the co-located reference direction flag indicates the forward reference block as the co-located block, that is, when the co-located block is the forward reference block, the temporal direct vector calculation unit 213 determines to use the backward reference motion vector among the two or more reference motion vectors. Subsequently, the temporal direct vector calculation unit 213 derives the motion vector of the current block in temporal direct using the determined reference motion vector (the forward reference motion vector or the backward reference motion vector) (Step S220).

Here, the co-located block can be determined as follows. That is, the variable-length decoding unit 215 decodes the co-located reference direction flag in units of picture. At this time, the temporal direct vector calculation unit 213 determines based on the co-located reference direction flag whether the forward reference block will be the co-located block or the backward reference block will be the co-located block.

Next, the picture decoding apparatus 200 decodes the current coded block (to be processed) included in the coded moving picture, using the motion vector calculated by the temporal direct vector calculation unit 213 (Step S220). Specifically, the inter prediction unit 210 generates prediction picture data, using the motion vector calculated by the temporal direct vector calculation unit 213. For example, in the case where the inter prediction mode flag decoded in units of blocks indicates decoding in temporal direct (the temporal direct mode), the inter prediction control unit 211 may instruct the inter prediction unit 210 to perform inter prediction in temporal direct. As a result, the inter prediction unit 210 performs the inter prediction for the current block using the motion vector derived in temporal direct, and thereby generates prediction picture data. Using the prediction picture data thus generated, the current block is decoded.

In this embodiment, when the reference block (the forward reference block or the backward reference block) has two or more reference motion vectors, it is determined based on the co-located reference direction flag which one of the reference motion vectors is to be used. However, the present invention is not limited to the determination based on the co-located reference direction flag. For example, when the co-located block has two or more reference motion vectors, it may be that a temporal distance of each of the reference motion vectors is calculated, and a reference motion vector having a short temporal distance is selected. Here, the temporal distance is calculated based on the number of pictures in display time between the reference picture including the reference block and the picture to which the reference picture refers. Furthermore, it may be that, first, the temporal distances of the two or more reference motion vectors are calculated, and when those temporal distances are different, the reference motion vector having a short temporal distance is selected, and when those temporal distances are equal, a reference motion vector is selected based on the co-located reference direction flag. Since the impact of the temporal distance is larger than the impact of the position of the reference block in deriving a suitable motion vector of the current block, determination by prioritizing the temporal distance allows derivation of a more suitable motion vector.

Furthermore, it may be that, for example, when the co-located block has two or more reference motion vectors, the magnitudes of the reference motion vectors are calculated and a reference motion vector having a small magnitude is selected. Here, the magnitude of the reference motion vector means the absolute value of the motion vector. Furthermore, it may be that, first, the magnitudes of the two or more reference motion vectors are calculated, and when those magnitudes are different, the reference motion vector having a small magnitude is selected, and when those magnitudes are equal, a reference motion vector is selected based on the co-located reference direction flag. Since the impact of the magnitude of the reference motion vector is larger than the impact of the position of the reference block in deriving a suitable motion vector of the current block, determination by prioritizing the magnitude of the reference motion vector allows derivation of a more suitable motion vector.

Furthermore, when the co-located block has no reference motion vector, it is also possible to derive a more suitable motion vector for the current block by determining a block of a new reference picture as the co-located block. For example, when the reference picture including the co-located block is located after the current picture in display order, the co-located block included in the reference picture located before the current picture in display order is selected. When the reference picture including the co-located block is located before the current picture in display order, the co-located block included in the reference picture located after the current picture in display order is selected. As above, when the co-located block has no reference motion vector, selecting, as the co-located block, a block included in a new reference picture, makes it possible to derive a motion vector having higher accuracy for the current block. When the newly selected co-located block has two or more reference motion vectors, it becomes possible to derive a motion vector having higher accuracy by selecting a reference motion vector based on whether the co-located block is the forward reference block or the backward reference block, or based on the temporal distance of the reference motion vector of the co-located block, or the magnitude of the reference motion vector of the co-located block, as described above.

Thus, according to this embodiment, when the co-located block has two or more reference motion vectors, the motion vector most suitable for the current block can be selected, which allows a bit stream compressed at high efficiency to be appropriately decoded.

Embodiment 6

The processing described in each of Embodiments can be simply implemented in an independent computer system, by recording, in a recording medium, a program for implementing the configurations of the moving picture coding method (the picture coding method) and the moving picture decoding method (the picture decoding method) described in each of Embodiments. The recording media may be any recording media as long as the program can be recorded, such as a magnetic disk, an optical disk, a magnetic optical disk, an IC card, and a semiconductor memory.

Hereinafter, the applications to the moving picture coding method (the picture coding method) and the moving picture decoding method (the picture decoding method) described in each of Embodiments and systems using them will be described. This system is characterized by including a picture coding and decoding apparatus composed of the picture coding apparatus using the picture coding method and the picture decoding apparatus using the picture decoding method. The other structure of the system can be appropriately changed depending on situations.

Figure 17:
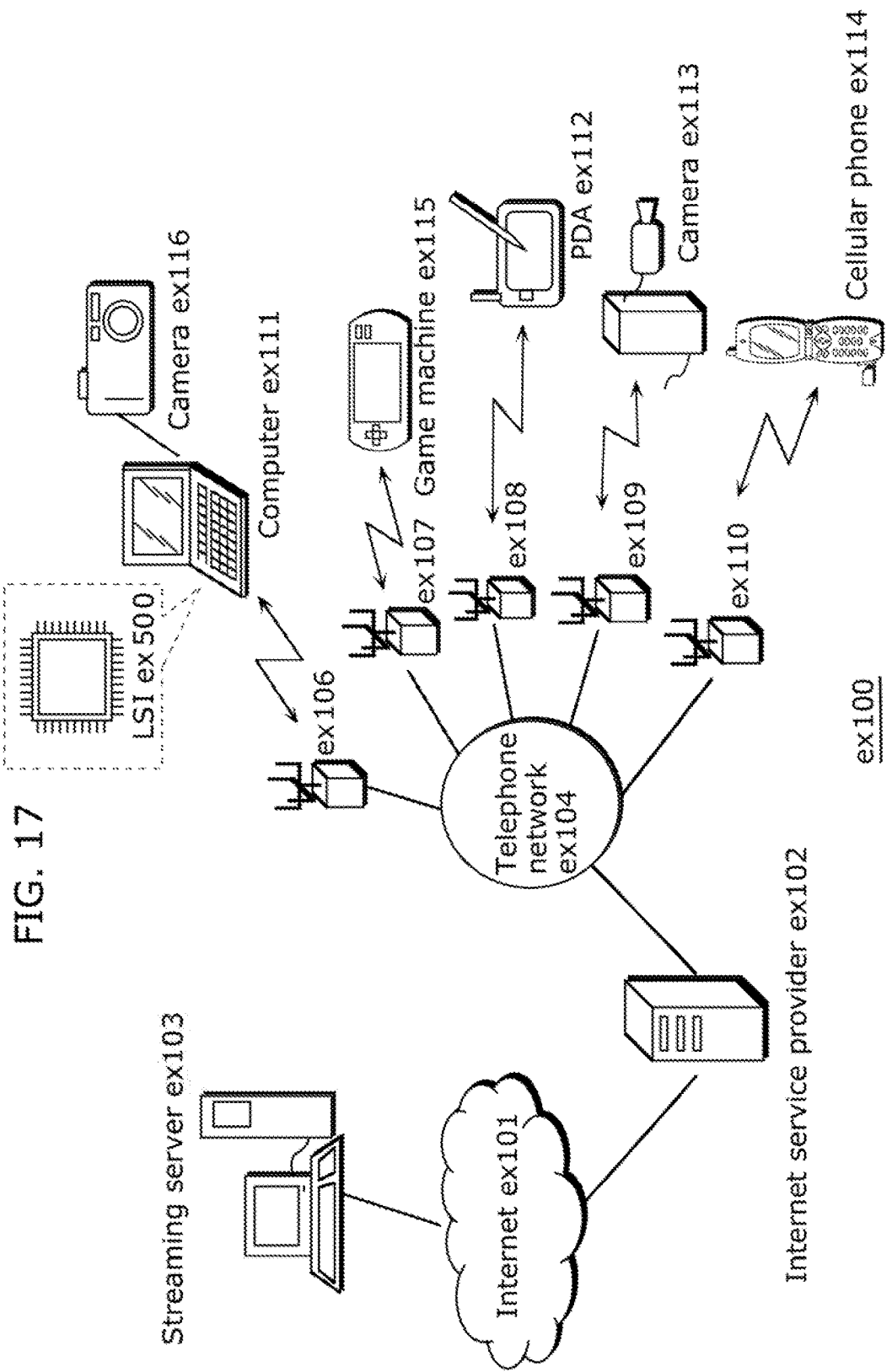
FIG. 17 illustrates an overall configuration of a content providing system for implementing content distribution services.

FIG. 17 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 17, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital video camera, is capable of capturing both still images and video. Furthermore, the cellular phone ex114 may be the one that meets any of the standards such as Global System for Mobile Communications (GSM), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of Embodiments (that is, the system functions as the picture coding apparatus according to an implementation of the present invention), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (that is, the system functions as the picture decoding apparatus according to the implementation of the present invention).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the image data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 18:
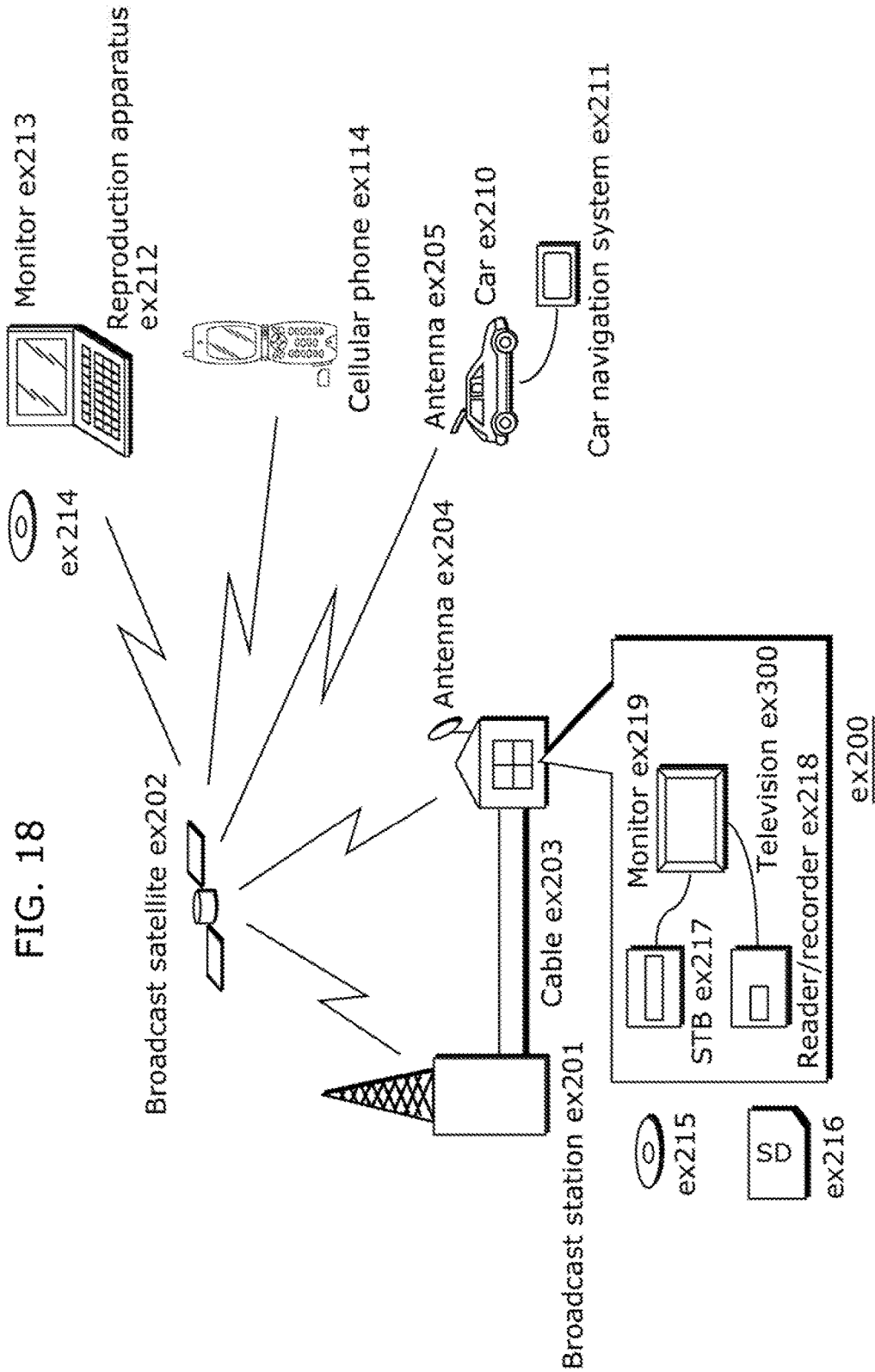
FIG. 18 illustrates an overall configuration of a digital broadcasting system.

Aside from the example of the content providing system ex100, at least one of the moving picture coding apparatus (the picture coding apparatus) and the moving picture decoding apparatus (the picture decoding apparatus) described in each of Embodiments may be implemented in a digital broadcasting system ex200 illustrated in FIG. 18. More specifically, a broadcast station ex201 communicates or transmits, via radio waves to a broadcast satellite ex202, multiplexed data obtained by multiplexing audio data and others onto video data. The video data is data coded by the moving picture coding method described in each of Embodiments (that is, the video data is data coded by the picture coding apparatus according to an implementation of the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (that is, the system functions as the picture decoding apparatus according to an implementation of the present invention).

Furthermore, a reader/recorder ex218 (i) reads and decodes the multiplexed data recorded on a recording media ex215, such as a DVD and a BD, or (ii) codes video signals in the recording medium ex215, and in some cases, writes data obtained by multiplexing an audio signal on the coded data. The reader/recorder ex218 can include the moving picture decoding apparatus or the moving picture coding apparatus as shown in each of Embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 19:
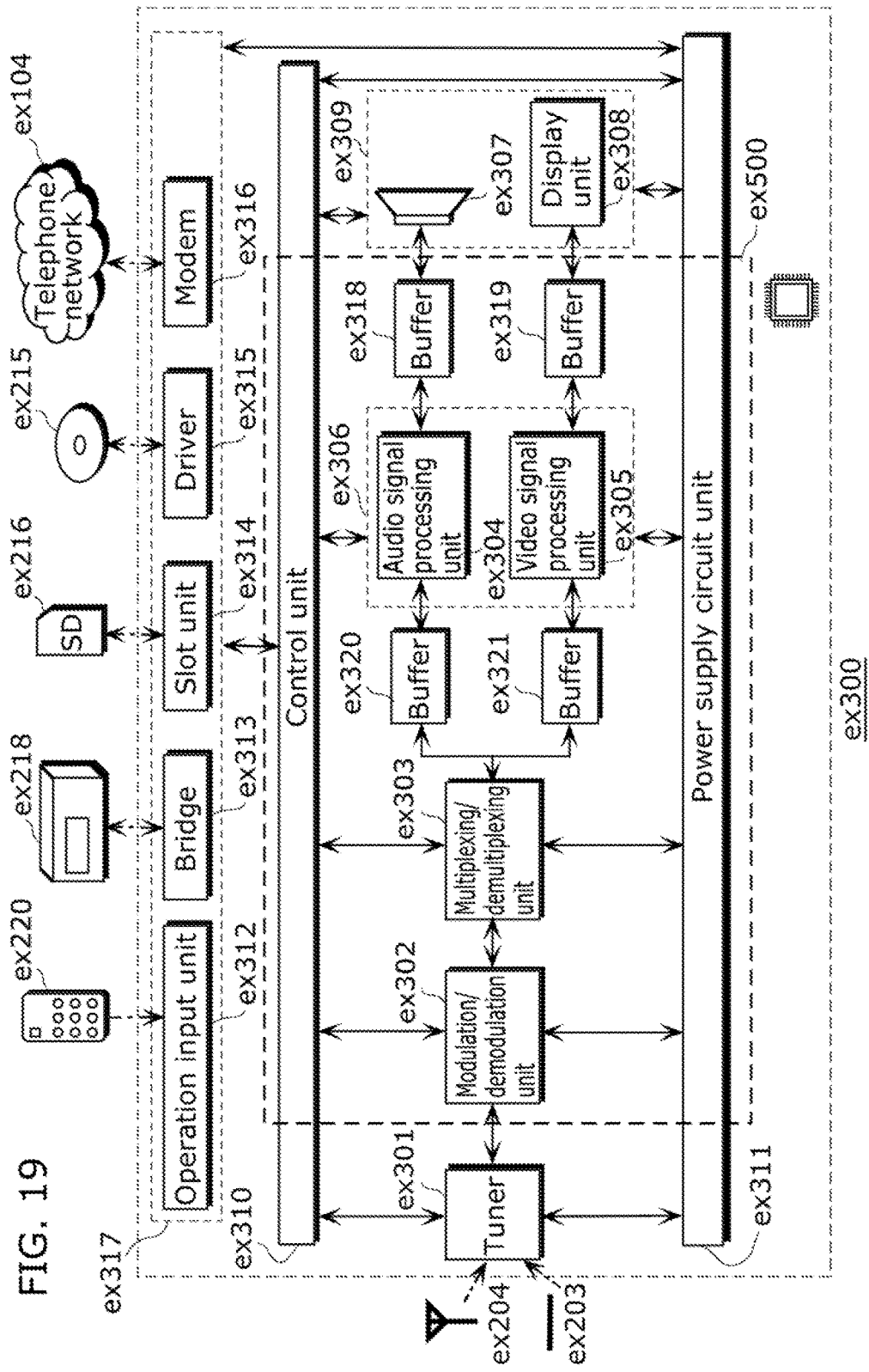
FIG. 19 is a block diagram illustrating an example of a configuration of a television.

FIG. 19 illustrates the television (receiver) ex300 that uses the moving picture coding method and the moving picture decoding method described in each of Embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 (functioning as the picture coding apparatus or the picture decoding apparatus according to an implementation of the present invention) that decode audio data and video data and code audio data and video data, respectively; and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of Embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of Embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, although not illustrate, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 20:
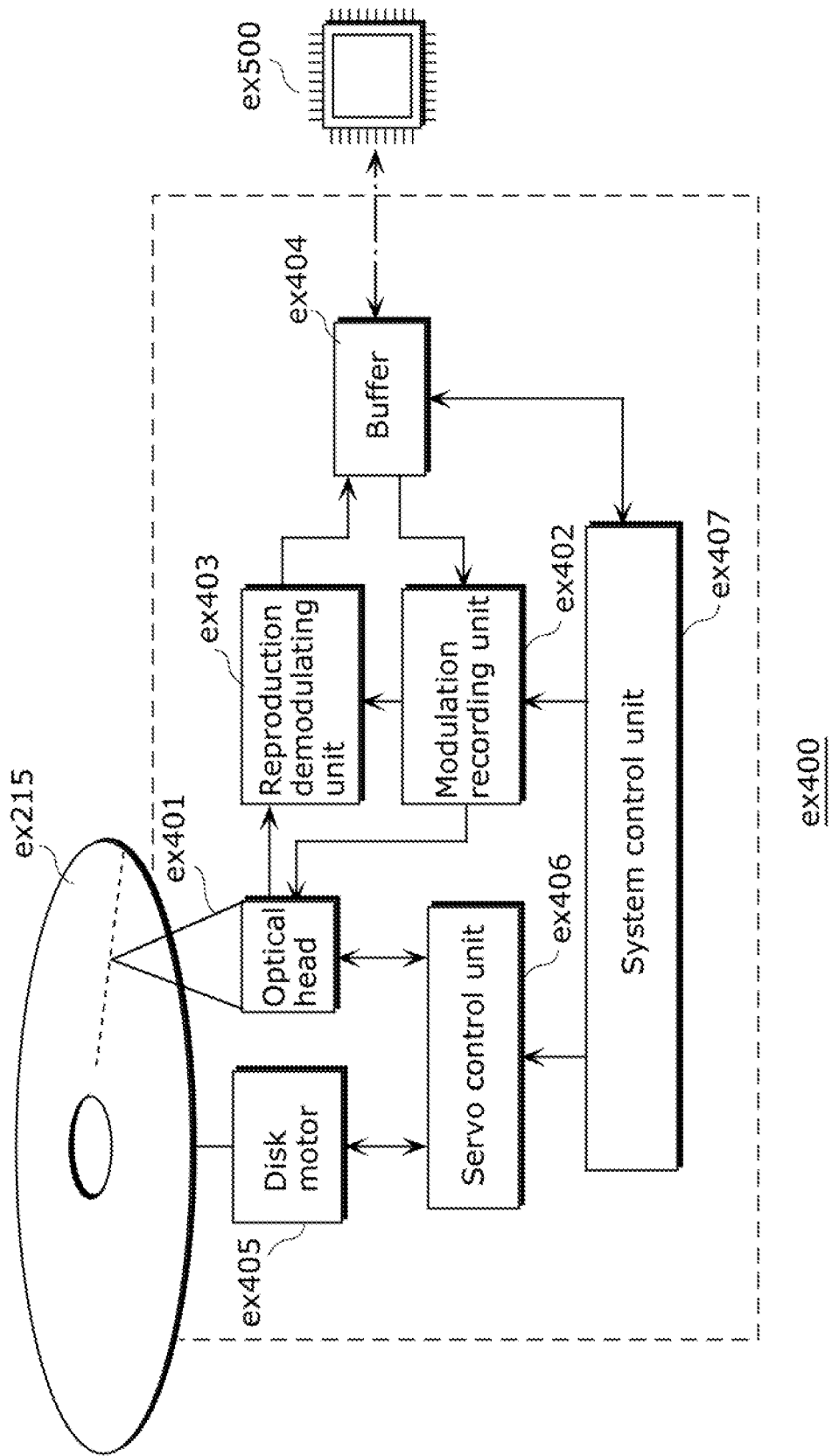
FIG. 20 is a block diagram illustrating an example of a configuration of an information reproducing/recording unit that reads and writes information from or on a recording medium that is an optical disk.

As an example, FIG. 20 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 21:
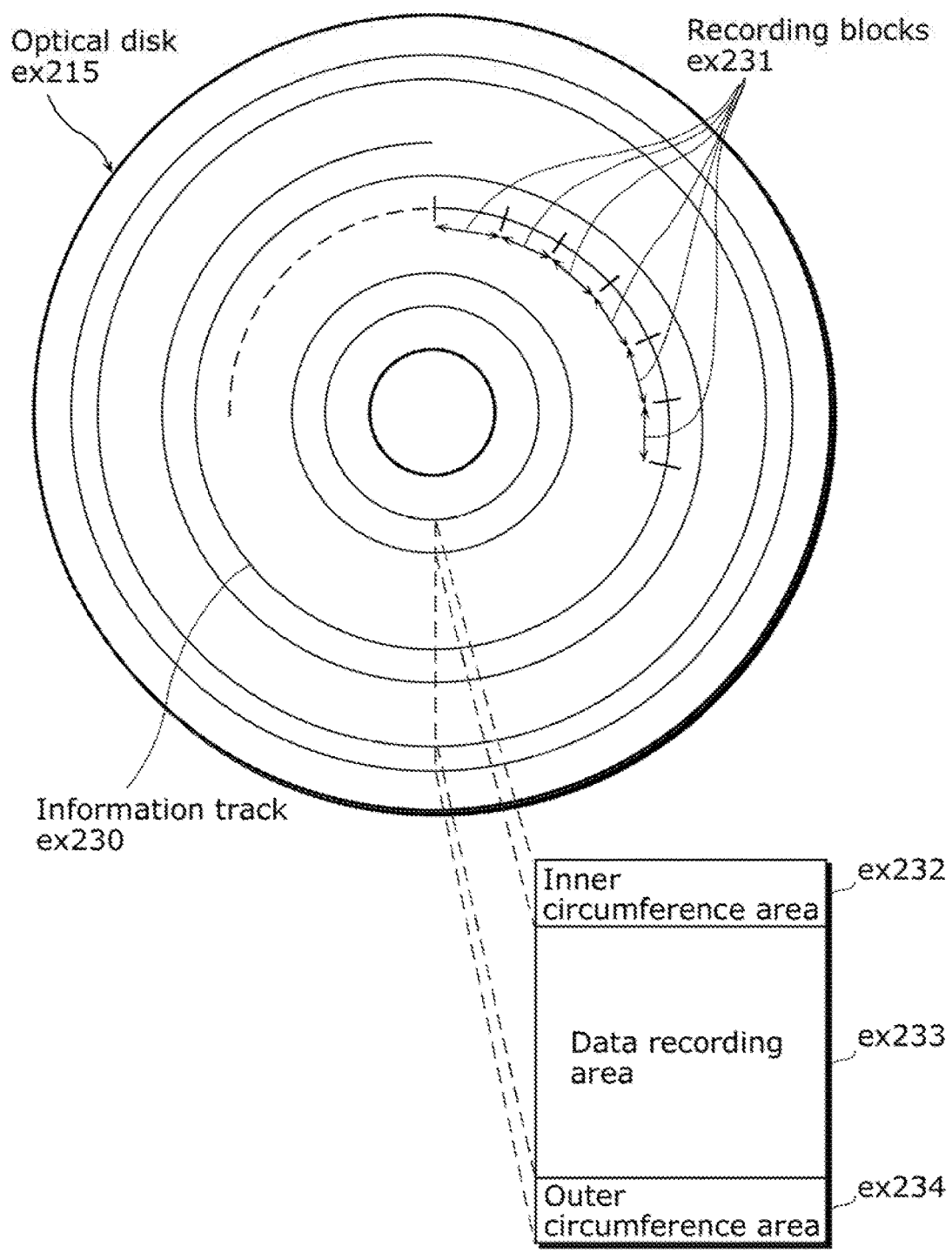
FIG. 21 shows an example of a configuration of a recording medium that is an optical disk.

FIG. 21 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 19. The same will be true for the configuration of the computer ex111, the cellular phone ex114, and others.

Figure 22A:
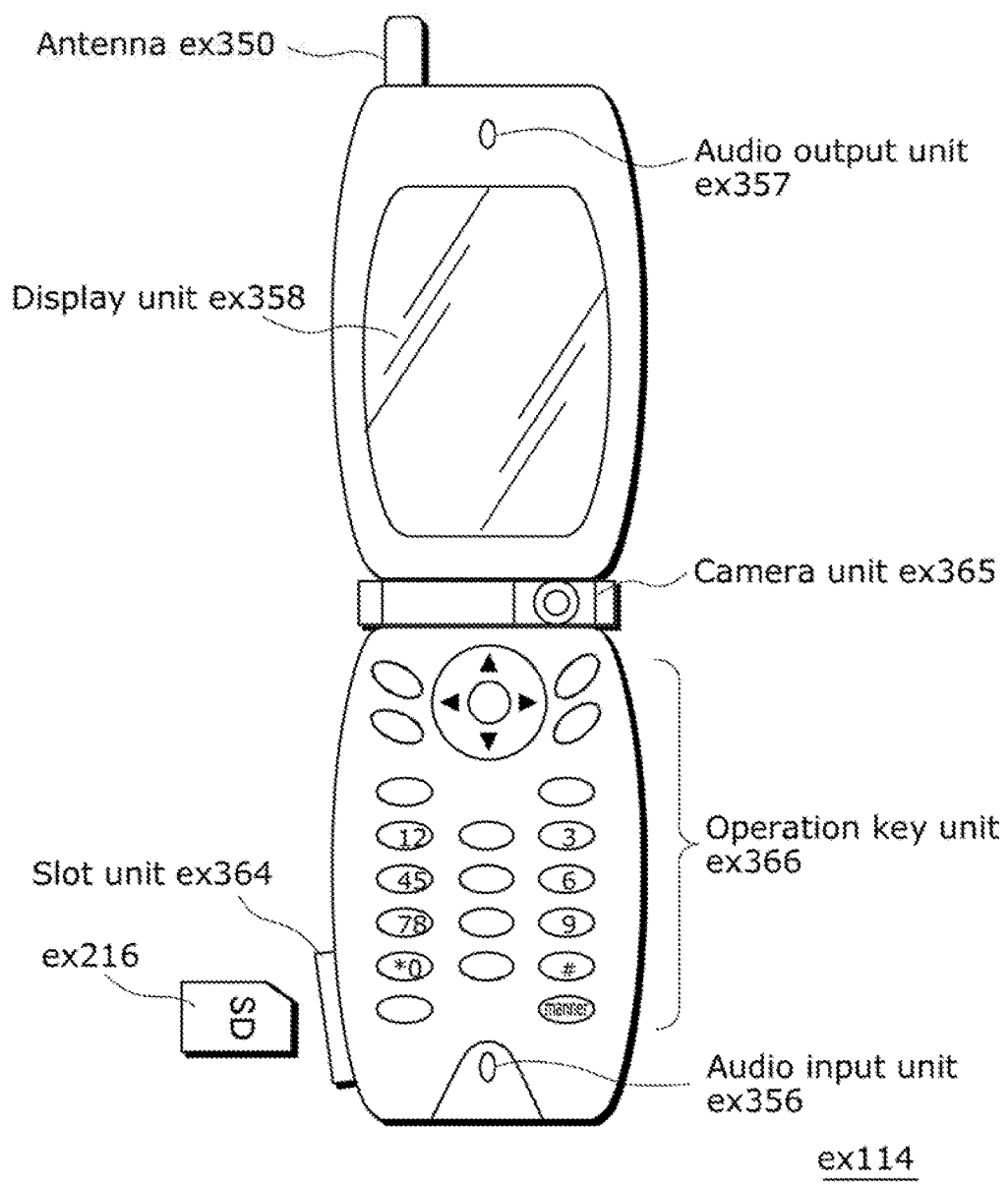
FIG. 22A shows an example of a cellular phone.

FIG. 22A illustrates the cellular phone ex114 that uses the moving picture coding method and the moving picture decoding method described in Embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Next, an example of a configuration of the cellular phone ex114 will be described with reference to FIG. 22B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of Embodiments (that is, the video signal processing unit ex355 functions as the picture coding apparatus according to an implementation of the present invention), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (the modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the coding method shown in each of Embodiments (that is, the video signal processing unit ex355 functions as the picture decoding apparatus according to an aspect of the present invention), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus.

Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of Embodiments can be used in any of the devices and systems described. Thus, the advantages described in each of Embodiments can be obtained.

Furthermore, the present invention is not limited to Embodiments, and various modifications and revisions are possible without departing from the scope of the present invention.

Embodiment 7

Video data can be generated by switching, as necessary, between (i) the moving picture coding method or the moving picture coding apparatus shown in each of Embodiments and (ii) a moving picture coding method or a moving picture coding apparatus in conformity with a different standard, such as MPEG-2, MPEG4-AVC, and VC-1.

Here, when a plurality of video data that conforms to the different standards is generated and is then decoded, the decoding methods need to be selected to conform to the different standards. However, since to which standard each of the plurality of the video data to be decoded conforms cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of Embodiments will be hereinafter described. The multiplexed data is a digital stream in the MPEG2-Transport Stream format.

FIG. 23 illustrates a structure of the multiplexed data. As illustrated in FIG. 23, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of Embodiments, or in a moving picture coding method or by a moving picture coding apparatus in conformity with a conventional standard, such as MPEG-2, MPEG4-AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1B00 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary video to be mixed with the primary audio.

Figure 24:
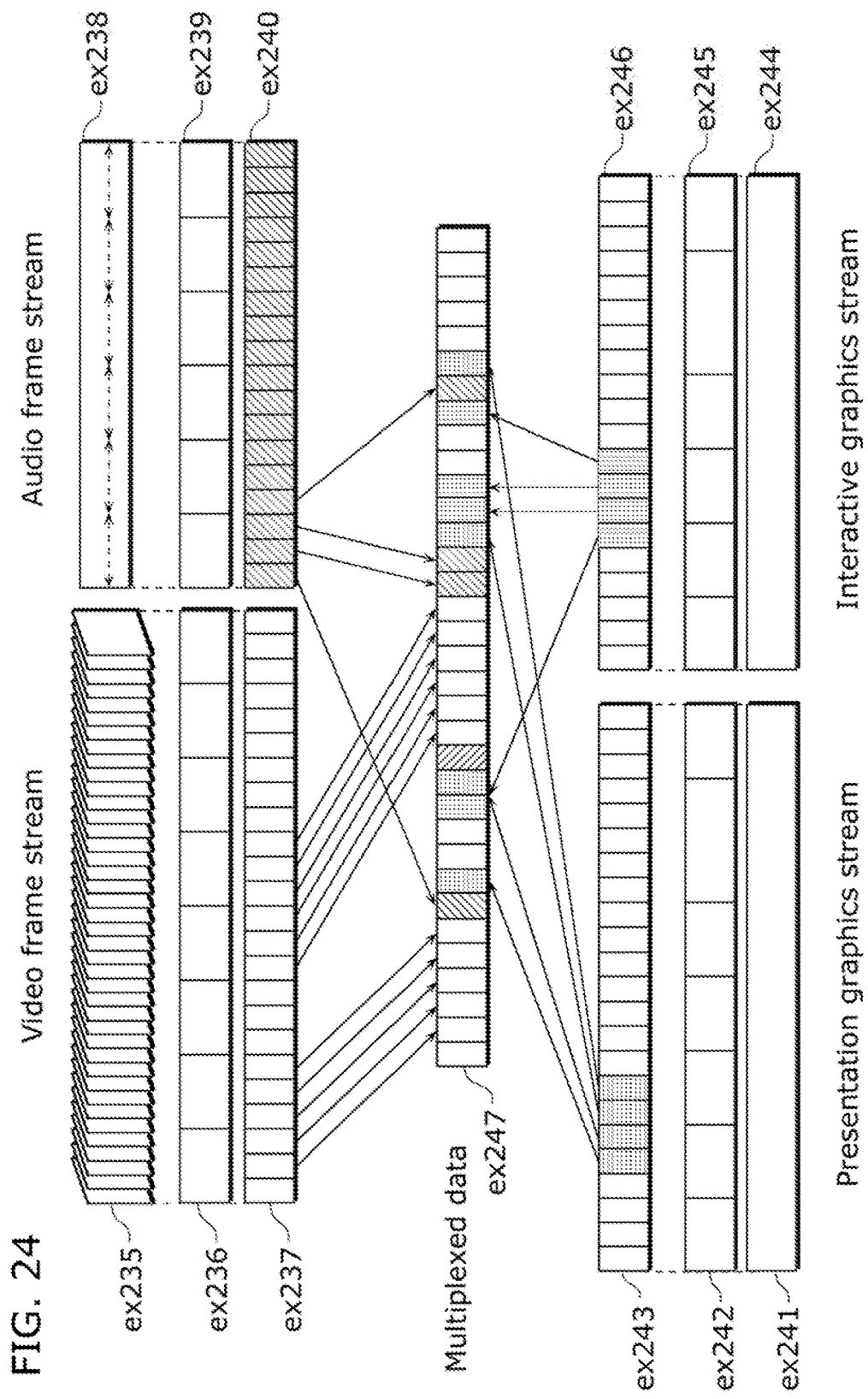
FIG. 24 schematically illustrates how each of streams is multiplexed in multiplexed data.

FIG. 24 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 25:
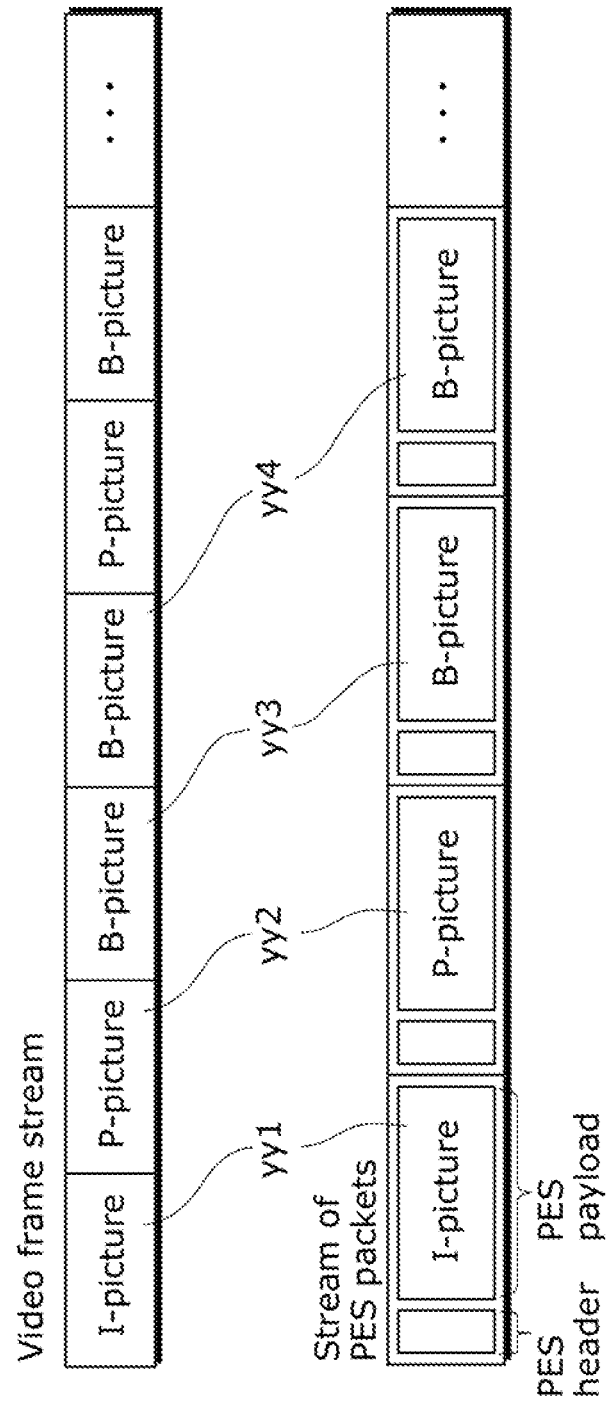
FIG. 25 illustrates how a video stream is stored in a stream of PES packets in more detail.

FIG. 25 illustrates how a video stream is stored in a stream of PES packets in more detail. The first bar in FIG. 25 shows a video frame stream in a video stream. The second bar shows the stream of PES packets. As indicated by arrows denoted as yy1, yy2, yy3, and yy4 in FIG. 25, the video stream is divided into pictures as I-pictures, B-pictures, and P-pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 26:
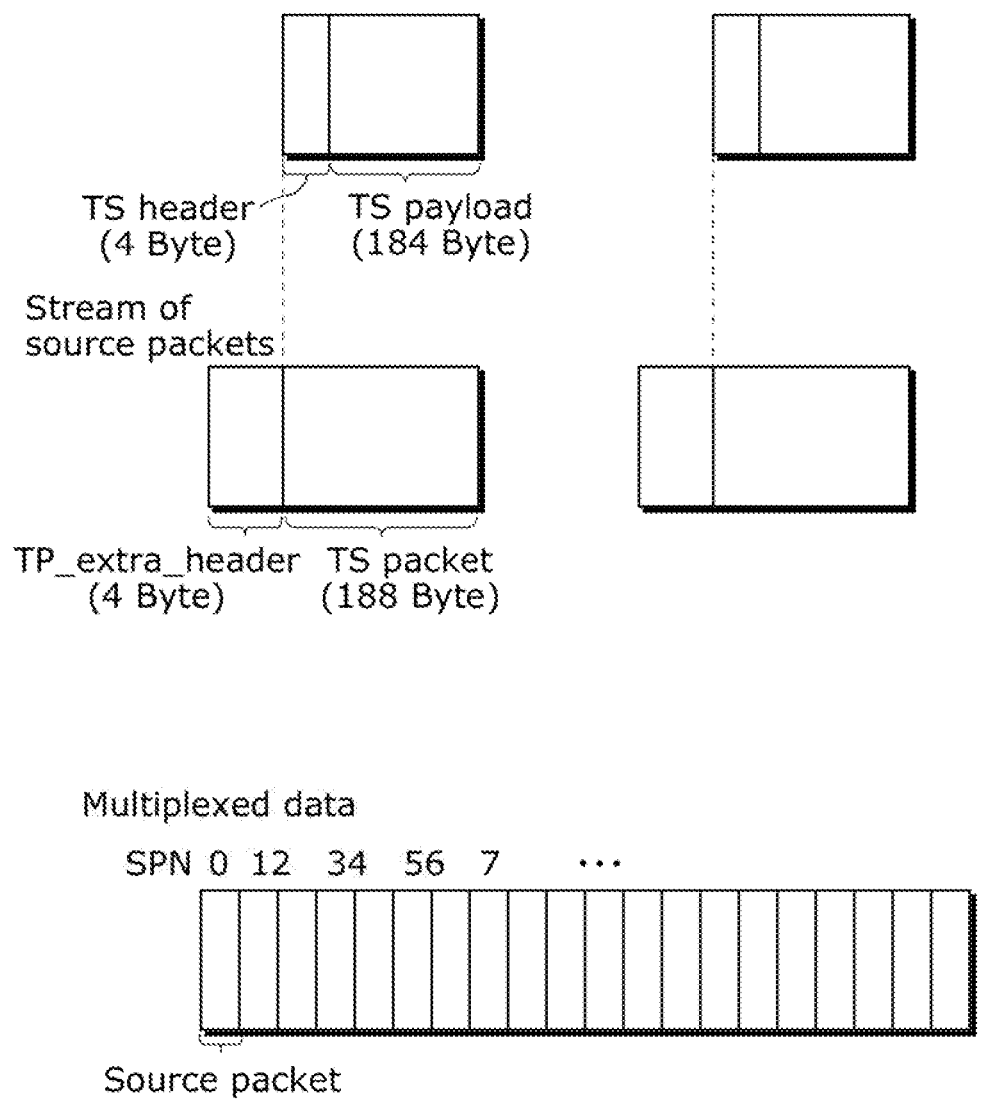
FIG. 26 shows a structure of TS packets and source packets in the multiplexed data.

FIG. 26 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 26. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 27:
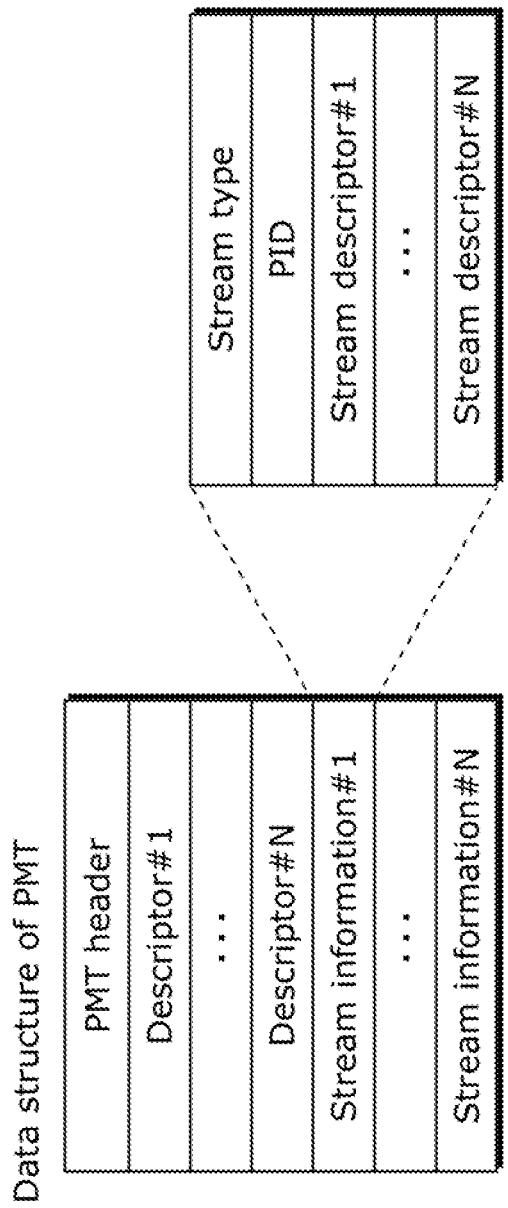
FIG. 27 shows a data structure of a PMT.

FIG. 27 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 28:
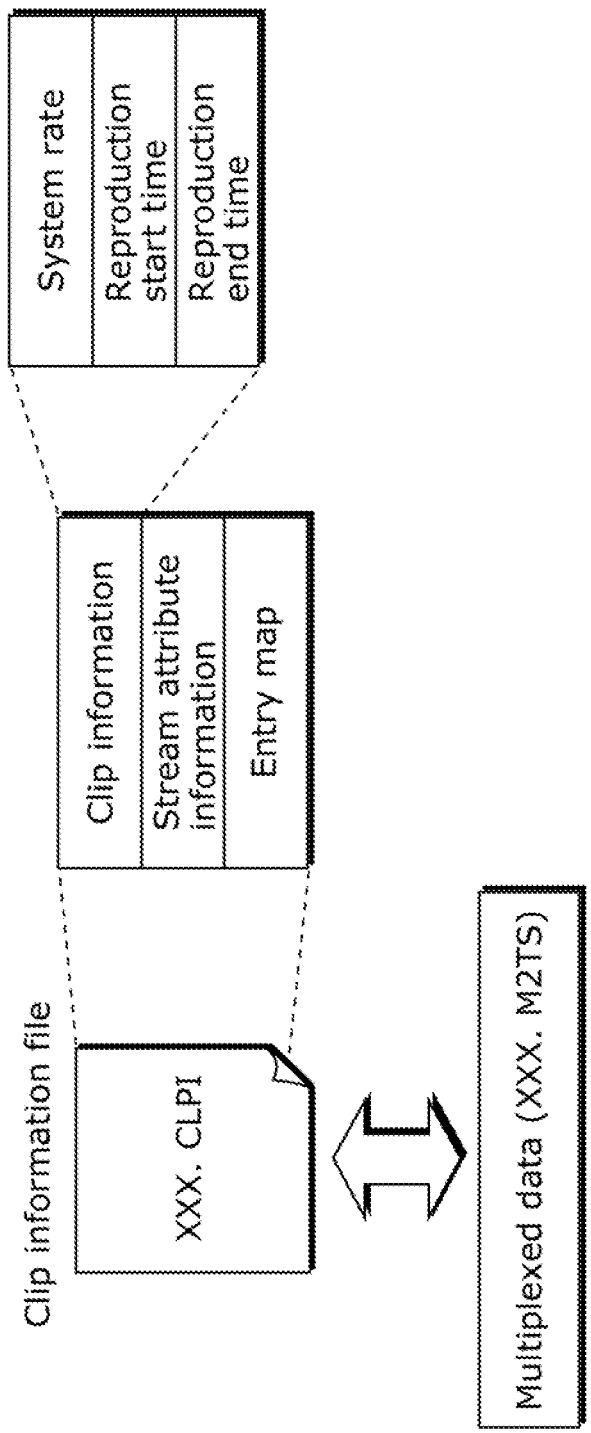
FIG. 28 shows an internal structure of multiplexed data information.

Each of the multiplexed data information files is management information of the multiplexed data as shown in FIG. 28. The multiplexed data information files are in one to one correspondence with the multiplexed data, and each of the files includes multiplexed data information, stream attribute information, and an entry map.

As illustrated in FIG. 28, the multiplexed data includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 29:
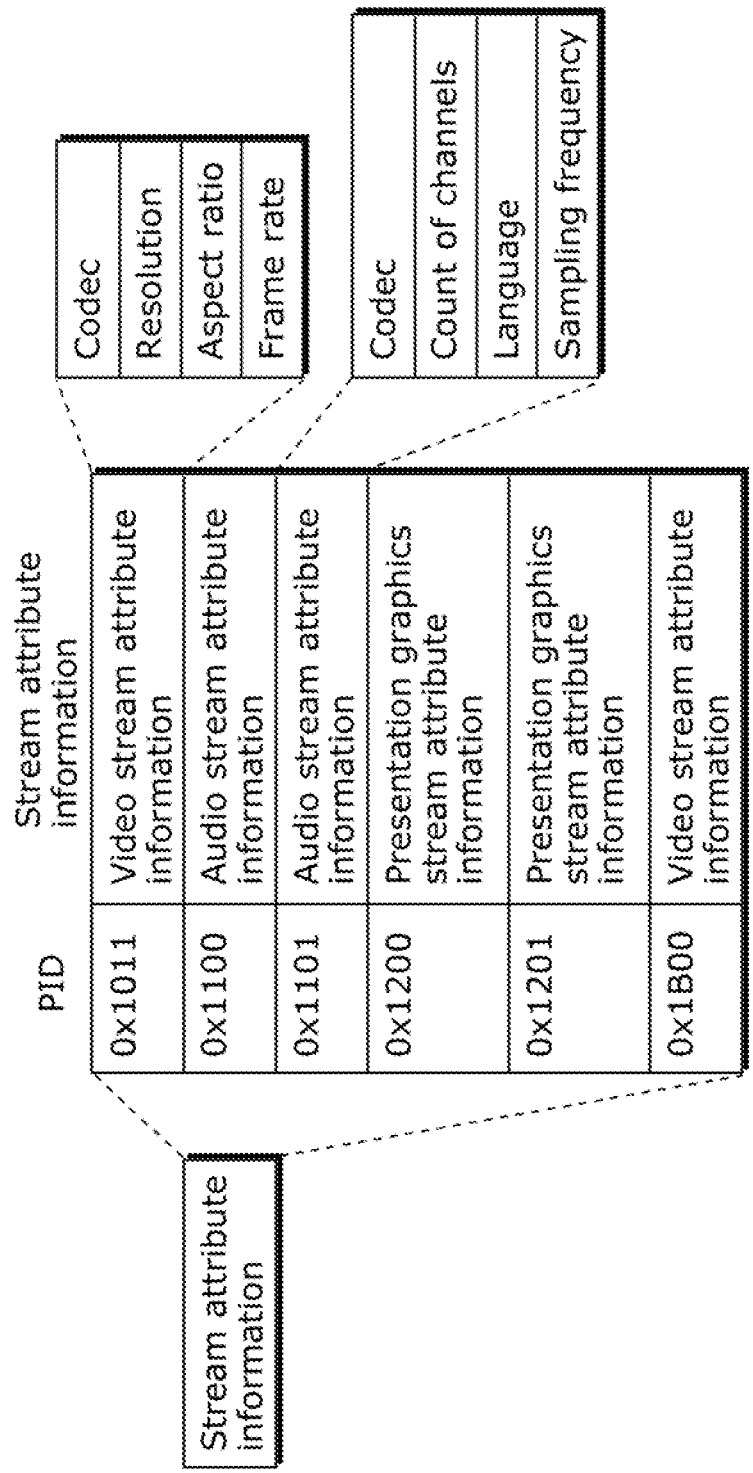
FIG. 29 shows an internal structure of stream attribute information.

As shown in FIG. 29, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In Embodiment 7, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of Embodiments includes a step or a unit for allocating unique information indicating video data generated by the moving picture coding method or the moving picture coding apparatus in each of Embodiments, to the stream type included in the PMT or the video stream attribute information. With the configuration, the video data generated by the moving picture coding method or the moving picture coding apparatus described in each of Embodiments can be distinguished from video data that conforms to another standard.

Figure 30:
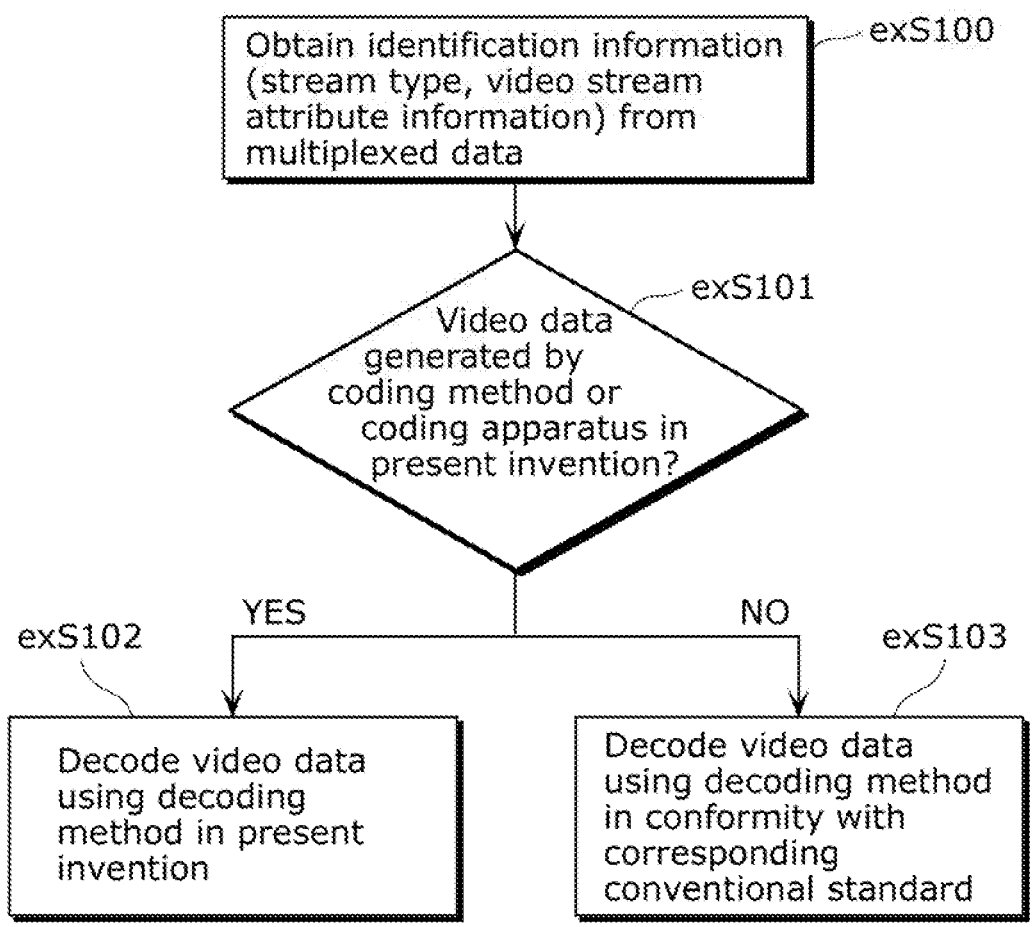
FIG. 30 shows steps for identifying video data.

Furthermore, FIG. 30 illustrates steps of the moving picture decoding method according to Embodiment 7. In Step exS100, the stream type included in the PMT or the video stream attribute information is obtained from the multiplexed data. Next, in Step exS101, it is determined whether or not the stream type or the video stream attribute information indicates that the multiplexed data is generated by the moving picture coding method or the moving picture coding apparatus in each of Embodiments. When it is determined that the stream type or the video stream attribute information indicates that the multiplexed data is generated by the moving picture coding method or the moving picture coding apparatus in each of Embodiments, in Step exS102, decoding is performed by the moving picture decoding method in each of Embodiments. Furthermore, when the stream type or the video stream attribute information indicates conformance to the conventional standards, such as MPEG-2, MPEG4-AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of Embodiments can perform decoding. Even when multiplexed data that conforms to a different standard, an appropriate decoding method or apparatus can be selected. Thus, it becomes possible to decode information without any error. Furthermore, the moving picture coding method or apparatus, or the moving picture decoding method or apparatus in Embodiment 7 can be used in the devices and systems described above.

Embodiment 8

Figure 31:
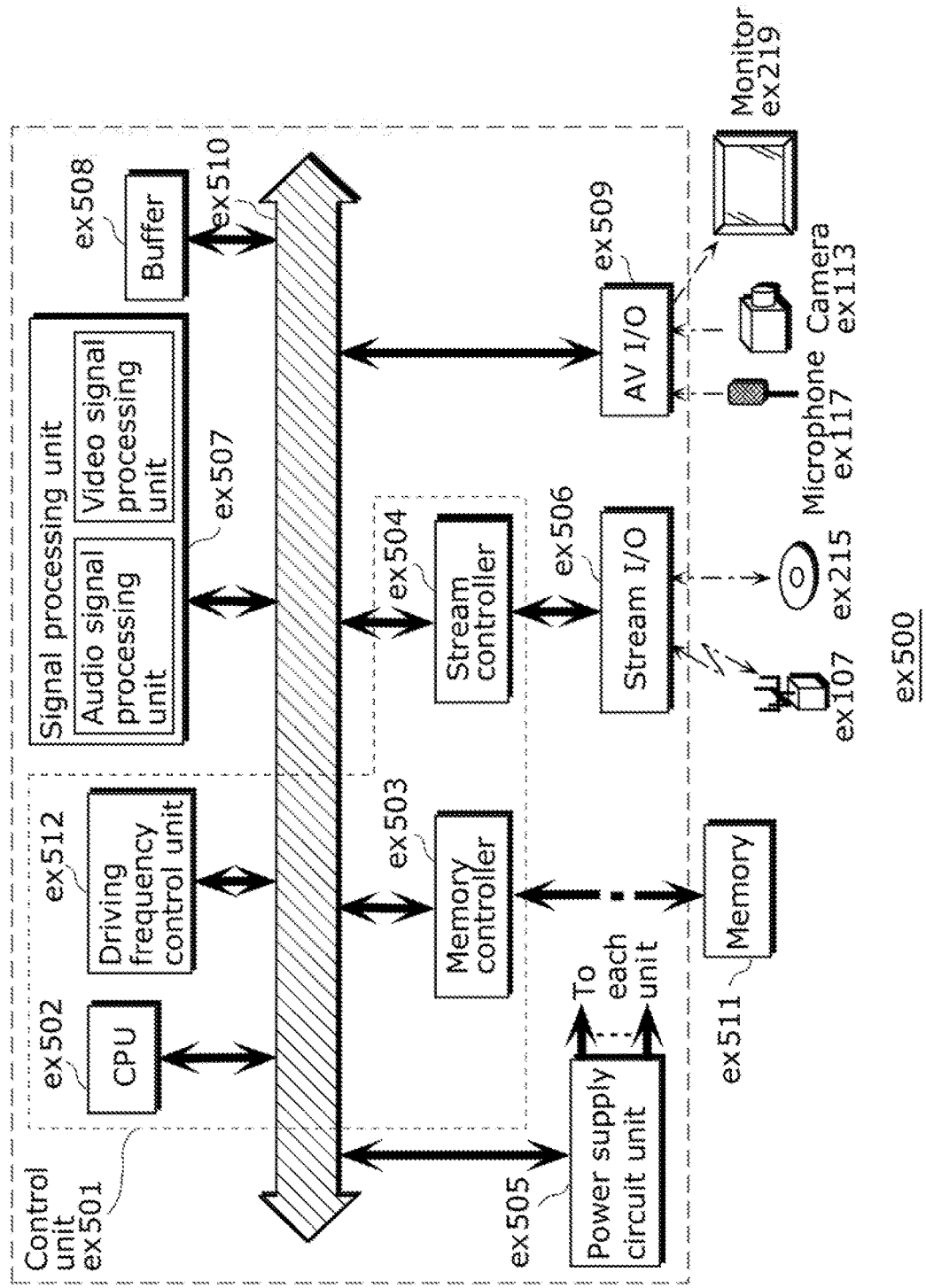
FIG. 31 is a block diagram illustrating an example of a configuration of an integrated circuit for implementing the moving picture coding method and the moving picture decoding method according to each of Embodiments.

Each of the moving picture coding method, the moving picture coding apparatus, the moving picture decoding method, and the moving picture decoding apparatus in each of Embodiments is typically achieved in the form of an integrated circuit or a Large Scale Integrated (LSI) circuit. As an example of the LSI, FIG. 31 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of Embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording media ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex510 includes the CPU ex502, the memory controller ex503, the stream controller ex504, the driving frequency control unit ex512, the configuration of the control unit ex510 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Embodiment 9

When video data generated in the moving picture coding method or by the moving picture coding apparatus described in each of Embodiments is decoded, compared to when video data that conforms to a conventional standard, such as MPEG-2, MPEG4-AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 32:
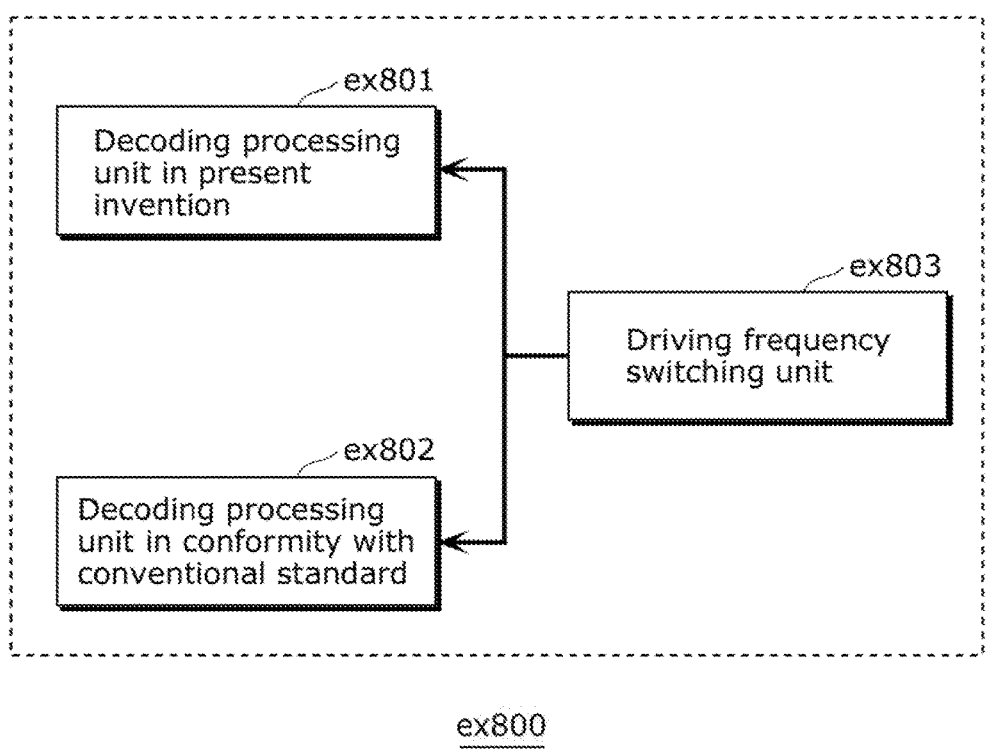
FIG. 32 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 32 illustrates a configuration ex800 in Embodiment 9. A driving frequency switching unit ex803 sets a driving frequency to a higher driving frequency when video data is generated by the moving picture coding method or the moving picture coding apparatus described in each of Embodiments. Then, the driving frequency switching unit ex803 instructs a decoding processing unit ex801 that executes the moving picture decoding method described in each of Embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of Embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 31. Here, each of the decoding processing unit ex801 that executes the moving picture decoding method described in each of Embodiments and the decoding processing unit ex802 that conforms to the conventional standard corresponds to the signal processing unit ex507 in FIG. 29. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 7 is probably used for identifying the video data. The identification information is not limited to the one described in Embodiment 7 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 34. The driving frequency can be selected by storing the look-up table in the buffer ex508 and in an internal memory of an LSI, and with reference to the look-up table by the CPU ex502.

Figure 33:
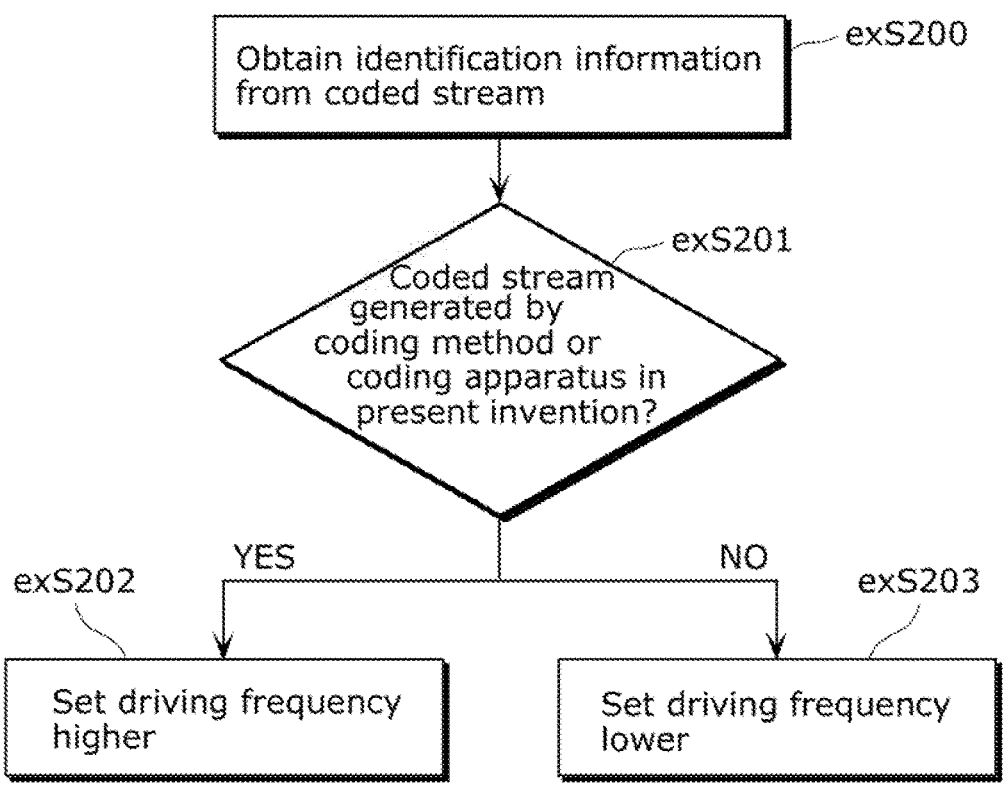
FIG. 33 shows steps for identifying video data and switching between driving frequencies.

FIG. 33 illustrates steps for executing a method in Embodiment 9. First, in Step exS200, the signal processing unit ex507 obtains identification information from the multiplexed data. Next, in Step exS201, the CPU ex502 determines whether or not the video data is generated by the coding method and the coding apparatus described in each of Embodiments, based on the identification information. When the video data is generated by the coding method and the coding apparatus described in each of Embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG4-AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of Embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-AVC is larger than the processing amount for decoding video data generated by the moving picture coding method and the moving picture coding apparatus described in each of Embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of Embodiments, the voltage to be applied to the LSI ex500 or the apparatus including the LSI ex500 is probably set higher. When the identification information indicates that the video data conforms to the conventional standard, such as MPEG-2, MPEG4-AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of Embodiments, the driving of the CPU ex502 does not probably have to be suspended. When the identification information indicates that the video data conforms to the conventional standard, such as MPEG-2, MPEG4-AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of Embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG4-AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 10

There are cases where a plurality of video data that conforms to different standards, is provided to the devices and systems, such as a television and a mobile phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 35A:
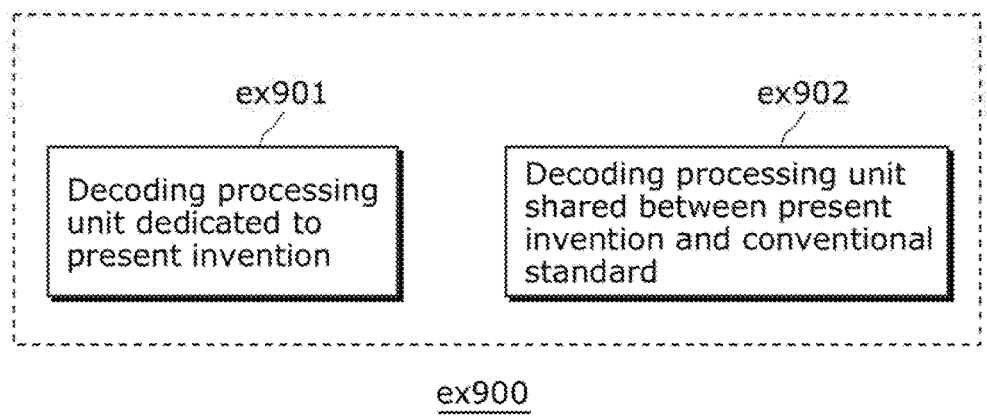
FIG. 35A shows an example of a configuration for sharing a module of a signal processing unit.

In order to solve the problem, what is conceived is a configuration in which the decoding processing unit for implementing the moving picture decoding method described in each of Embodiments and the decoding processing unit that conforms to the conventional standard, such as MPEG-2, MPEG4-AVC, and VC-1 are partly shared. Ex900 in FIG. 35A shows an example of the configuration. For example, the moving picture decoding method described in each of Embodiments and the moving picture decoding method that conforms to MPEG4-AVC have, partly in common, the details of processing, such as entropy coding, inverse quantization, deblocking filtering, and motion compensated prediction. The details of processing to be shared probably include use of a decoding processing unit ex902 that conforms to MPEG4-AVC. In contrast, a dedicated decoding processing unit ex901 is probably used for other processing that does not conform to MPEG4-AVC and is unique to the present invention. Since the present invention is characterized by a transformation unit in particular, for example, the dedicated decoding processing unit ex901 is used for inverse transform. Otherwise, the decoding processing unit is probably shared for one of the entropy coding, deblocking filtering, and motion compensated prediction, or all of the processing. The decoding processing unit for implementing the moving picture decoding method described in each of Embodiments may be shared for the processing to be shared, and a dedicated decoding processing unit may be used for processing unique to that of MPEG4-AVC.

Figure 35B:
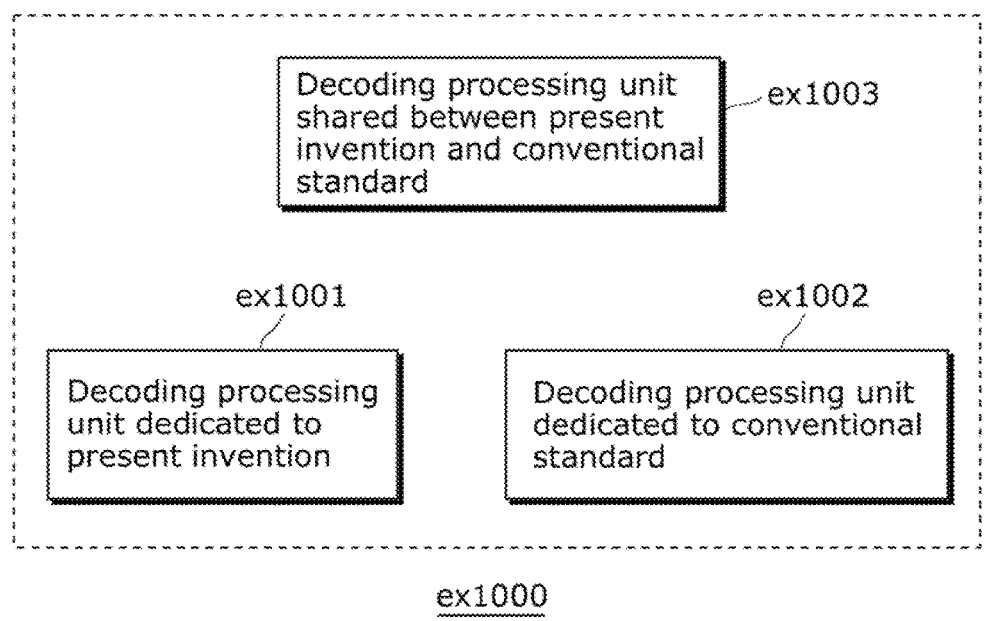
FIG. 35B shows another example of a configuration for sharing a module of a signal processing unit.

Furthermore, ex1000 in FIG. 35B shows another example in that processing is partly shared. This example uses a configuration including a dedicated decoding processing unit ex1001 that supports the processing unique to the present invention, a dedicated decoding processing unit ex1002 that supports the processing unique to another conventional standard, and a decoding processing unit ex1003 that supports processing to be shared between the moving picture decoding method in the present invention and the conventional moving picture decoding method. Here, the dedicated decoding processing units ex1001 and ex1002 are not necessarily specialized for the processing of the present invention and the processing of the conventional standard, respectively, and may be the ones capable of implementing general processing. Furthermore, the configuration of Embodiment 10 can be implemented by the LSI ex500.

As such, reducing the scale of the circuit of an LSI and reducing the cost are possible by sharing the decoding processing unit for the processing to be shared between the moving picture decoding method in the present invention and the moving picture decoding method in conformity with the conventional standard.

The motion vector calculation method, the picture coding method, and the picture decoding method according to the present invention produce an effect of attaining a higher compression rate and are applicable to, for example, video cameras, cellular phones with functions of capturing and reproducing video, personal computers, or recoding/playback devices.

REFERENCE SIGNS LIST

100 Picture coding apparatus
101 Substractor
102 Orthogonal transform unit
103 Quantization unit
104 Inverse quantization unit
105 Inverse orthogonal transform unit
106 Adder
107 Block memory
108 Frame memory
109 Intra prediction unit 110 Inter prediction unit
111 Inter prediction control unit
112 Picture type determination unit
113 Temporal direct vector calculation unit
114 Co-located reference direction determination unit
115 Variable-length coding unit
200 Picture decoding apparatus
204 Inverse quantization unit
205 Inverse orthogonal transform unit
206 Adder
207 Block memory
208 Frame memory
209 Intra prediction unit
210 Inter prediction unit
211 Inter prediction control unit
213 Temporal direct vector calculation unit
215 Variable-length decoding unit

The invention claimed is:

1. A decoding method of decoding a current block included in a current picture, the current picture being included in a coded video stream, the decoding method comprising:
   determining a reference picture in the coded video stream, the reference picture being included in one of (i) a first reference picture group of the current block and (ii) a second reference picture group of the current block;
   selecting a reference motion vector among from one or more reference motion vectors of a reference block in the reference picture such that in situation (A) when the reference block has a first reference motion vector and a second reference motion vector that respectively correspond to the first reference picture group and the second reference picture group, (i) the first reference motion vector is selected when the reference picture is included in the second reference picture group and (ii) the second reference motion vector is selected when the reference picture is included in the first reference picture group, in situation (B) when the reference block has only one reference motion vector, the only reference motion vector is selected, and in situation (C) when the reference block has no reference motion vector, a zero reference motion vector is selected;
   deriving the motion vector of the current block using the selected one reference motion vector; and
   decoding the current block using the derived motion vector.

2. The decoding method according to claim 1, further comprising:
   obtaining a position flag added to the current picture including the current block,
   wherein, in the selecting, in the case where the reference block has, as the first reference motion vector and the second reference motion vector, a forward reference motion vector directed forward and a backward reference motion vector directed backward,
   the forward reference motion vector is selected from among the first reference motion vector and the second reference motion vector when the position flag indicates that the reference block is located after the current block, and
   the backward reference motion vector is selected from among the first reference motion vector and the second reference motion vector when the position flag indicates that the reference block is located before the current block.

3. The decoding method according to claim 1, wherein:
   in the situation (A), the first reference motion vector is a forward reference motion vector directed forward and the second reference motion vector is a backward reference motion vector directed backward,
   the forward reference motion vector is selected when the reference block is located after the current block, and the backward reference motion vector is selected when the reference block is located before the current block.

4. A decoding apparatus for decoding a current block included in a current picture, the current picture being included in a coded video stream, the decoding apparatus comprising:
   a processor;
   a non-transitory memory having stored thereon executable instructions, which when executed by the processor, cause the processor to perform the following steps:
   determining a reference picture in the coded video stream, the reference picture being included in one of (i) a first reference picture group of the current block and (ii) a second reference picture group of the current block;
   selecting a reference motion vector among from one or more reference motion vectors of a reference block in the reference picture such that in situation (A) when the reference block has a first reference motion vector and a second reference motion vector that respectively correspond to the first reference picture group and the second reference picture group, (i) the first reference motion vector is selected when the reference picture is included in the second reference picture group and (ii) the second reference motion vector is selected when the reference picture is included in the first reference picture group, in situation (B) when the reference block has only one reference motion vector, the only reference motion vector is selected, and in situation (C) when the reference block has no reference motion vector, a zero reference motion vector is selected;
   deriving the motion vector of the current block using the selected one reference motion vector; and
   decoding the current block using the derived motion vector.

5. The decoding apparatus in claim 4, wherein:
   in the situation (A), the first reference motion vector is a forward reference motion vector directed forward and the second reference motion vector is a backward reference motion vector directed backward,
   the forward reference motion vector is selected when the reference block is located after the current block, and the backward reference motion vector is selected when the reference block is located before the current block.

6. The decoding apparatus in claim 4, wherein the non-transitory memory includes executable instructions, which when executed by the processor, cause the processor to perform the following:
   obtaining a position flag added to the current picture including the current block,
   wherein, in said selecting, in the case where the reference block has, as the first reference motion vector and the second reference motion vector, a forward reference motion vector directed forward and a backward reference motion vector directed backward,
   the forward reference motion vector is selected from among the first reference motion vector and the second reference motion vector when the position flag indicates that the reference block is located after the current block, and
   the backward reference motion vector is selected from among the first reference motion vector and the second reference motion vector when the position flag indicates that the reference block is located before the current block.

7. A decoding apparatus for decoding a current block included in a current picture, the current picture being included in a coded video stream, the decoding method comprising:
processing circuitry configured to:
determine a reference picture in the coded video stream, the reference picture being included in one of (i) a first reference picture group of the current block and (ii) a second reference picture group of the current block;
select a reference motion vector among from one or more reference motion vectors of a reference block in the reference picture such that in situation (A) when the reference block has a first reference motion vector and a second reference motion vector that respectively correspond to the first reference picture group and the second reference picture group, (i) the first reference motion vector is selected when the reference picture is included in the second reference picture group and (ii) the second reference motion vector is selected when the reference picture is included in the first reference picture group, in situation (B) when the reference block has only one reference motion vector, the only reference motion vector is selected, and in situation (C) when the reference block has no reference motion vector, a zero reference motion vector is selected;
derive the motion vector of the current block using the selected one reference motion vector; and
decoding circuitry configured to decode the current block using the derived motion vector.

8. The decoding apparatus in claim 7, wherein:
in the situation (A), the first reference motion vector is a forward reference motion vector directed forward and the second reference motion vector is a backward reference motion vector directed backward,
the forward reference motion vector is selected when the reference block is located after the current block, and the backward reference motion vector is selected when the reference block is located before the current block.

9. The decoding apparatus in claim 7, wherein the non-transitory memory includes executable instructions, which when executed by the processor, cause the processor to perform the following:
obtaining a position flag added to the current picture including the current block,
wherein, in said selecting, in the case where the reference block has, as the first reference motion vector and the second reference motion vector, a forward reference motion vector directed forward and a backward reference motion vector directed backward,
the forward reference motion vector is selected from among the first reference motion vector and the second reference motion vector when the position flag indicates that the reference block is located after the current block, and
the backward reference motion vector is selected from among the first reference motion vector and the second reference motion vector when the position flag indicates that the reference block is located before the current block.

* * * * *

UNITED STATES PATENT AND TRADEMARK OFFICE
CERTIFICATE OF CORRECTION

PATENT NO. : 10,218,997 B2
APPLICATION NO. : 15/851870
DATED : February 26, 2019
INVENTOR(S) : Sugio et al.

Page 1 of 1

It is certified that error appears in the above-identified patent and that said Letters Patent is hereby corrected as shown below:

In the Specification

Column 12, Lines 30-31, Expression 1, change "(B4-B-0)" to --(B4-B0)--

Column 25, Lines 16-17, change "each of Embodiments" to --each of Embodiments--

Column 29, Line 67, change "0x1B00" to --0x1400--

Column 30, Lines 50-51, change "The PAT" to --The PAT--

Signed and Sealed this
Twenty-eighth Day of May, 2019

Andrei Iancu
*Director of the United States Patent and Trademark Office*